(12) United States Patent
Sekine et al.

(10) Patent No.: US 11,001,006 B2
(45) Date of Patent: May 11, 2021

(54) ADDITIVE MANUFACTURING APPARATUS

(71) Applicant: CANON KABUSHIKI KAISHA, Tokyo (JP)

(72) Inventors: Yasuhiro Sekine, Yokohama (JP); Toshiki Ito, Kawasaki (JP); Yukio Hanyu, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 16/121,124

(22) Filed: Sep. 4, 2018

(65) Prior Publication Data

US 2018/0370148 A1 Dec. 27, 2018

Related U.S. Application Data

(63) Continuation of application No. PCT/JP2017/006458, filed on Feb. 22, 2017.

(30) Foreign Application Priority Data

Mar. 9, 2016 (JP) .............................. JP2016-046345
Jan. 31, 2017 (JP) .............................. JP2017-016261

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/129* (2017.08); *B29C 64/264* (2017.08);
(Continued)

(58) Field of Classification Search
CPC ............................ B29C 64/264; B29C 64/364
See application file for complete search history.

(56) References Cited

U.S. PATENT DOCUMENTS 7,614,866 B2  11/2009  Sperry et al.
7,706,910 B2   4/2010  Hull et al.
(Continued)

FOREIGN PATENT DOCUMENTS

| JP | 2014-037148 A | 2/2014 |
|---|---|---|
| WO | 2017/154457 A1 | 9/2017 |
| WO | 2017/154564 A1 | 9/2017 |

OTHER PUBLICATIONS

International Search Report in International Application No. PCT/JP2017/006458 (dated Apr. 2017).
(Continued)

*Primary Examiner* — Joseph A Miller, Jr.
(74) *Attorney, Agent, or Firm* — Venable LLP

(57) ABSTRACT

An additive manufacturing apparatus in which a streak in a manufacturing direction is difficult to be made on the surface of a product manufactured object in a boundary region of projection regions of exposure images is provided. In this apparatus, a vessel holds a photosetting liquid resin material, a first projector makes a first exposure image incident from an incident surface and projects it into the resin material, a second projector makes a second exposure image, continuous with the first exposure image, incident from the incident surface and projects it into the resin material, and a controlling unit adjusts on a projection surface a boundary region between a first projection image obtained by projecting the first exposure image by the first projector and a second projection image obtained by projecting the second exposure image by the second projector.

3 Claims, 24 Drawing Sheets

(51) Int. Cl.
    *B33Y 30/00*         (2015.01)
    *B33Y 50/02*         (2015.01)
    *B33Y 70/00*         (2020.01)
    *B29C 64/264*       (2017.01)
    *B29C 64/364*       (2017.01)
    *B33Y 40/00*         (2020.01)
    *B29C 64/129*       (2017.01)

(52) U.S. Cl.
    CPC ............ *B29C 64/364* (2017.08); *B33Y 10/00* (2014.12); *B33Y 30/00* (2014.12); *B33Y 40/00* (2014.12); *B33Y 50/02* (2014.12); *B33Y 70/00* (2014.12)

(56) References Cited

U.S. PATENT DOCUMENTS

| | | | |
|---|---|---|---|
| 7,731,887 B2 | 6/2010 | Hull et al. | |
| 7,771,183 B2 | 8/2010 | Hull et al. | |
| 8,003,039 B2 | 8/2011 | Sperry et al. | |
| 8,105,066 B2 | 1/2012 | Sperry et al. | |
| 8,221,671 B2 | 7/2012 | Hull et al. | |
| 8,465,689 B2 | 6/2013 | Sperry et al. | |
| 9,216,546 B2 | 12/2015 | Desimone et al. | |
| 2008/0169586 A1* | 7/2008 | Hull | B33Y 50/02 264/401 |
| 2008/0170112 A1 | 7/2008 | Hull et al. | |
| 2008/0181977 A1 | 7/2008 | Sperry et al. | |
| 2008/0226346 A1 | 9/2008 | Hull et al. | |
| 2010/0125356 A1* | 5/2010 | Shkolnik | G06T 5/006 700/98 |
| 2015/0054198 A1 | 2/2015 | Zenere | |
| 2018/0056587 A1 | 3/2018 | Arai et al. | |
| 2018/0065302 A1 | 3/2018 | Arai et al. | |

OTHER PUBLICATIONS

International Preliminary Report on Patentability in International Application No. PCT/JP2017/006458 (dated Sep. 2018).
Notification of Reason for Refusal in Japanese Patent Application No. 2017-016261 (dated Jun. 30, 2020).
Ishibe, U.S. Appl. No. 16/121,164, filed Sep. 4, 2018.

\* cited by examiner

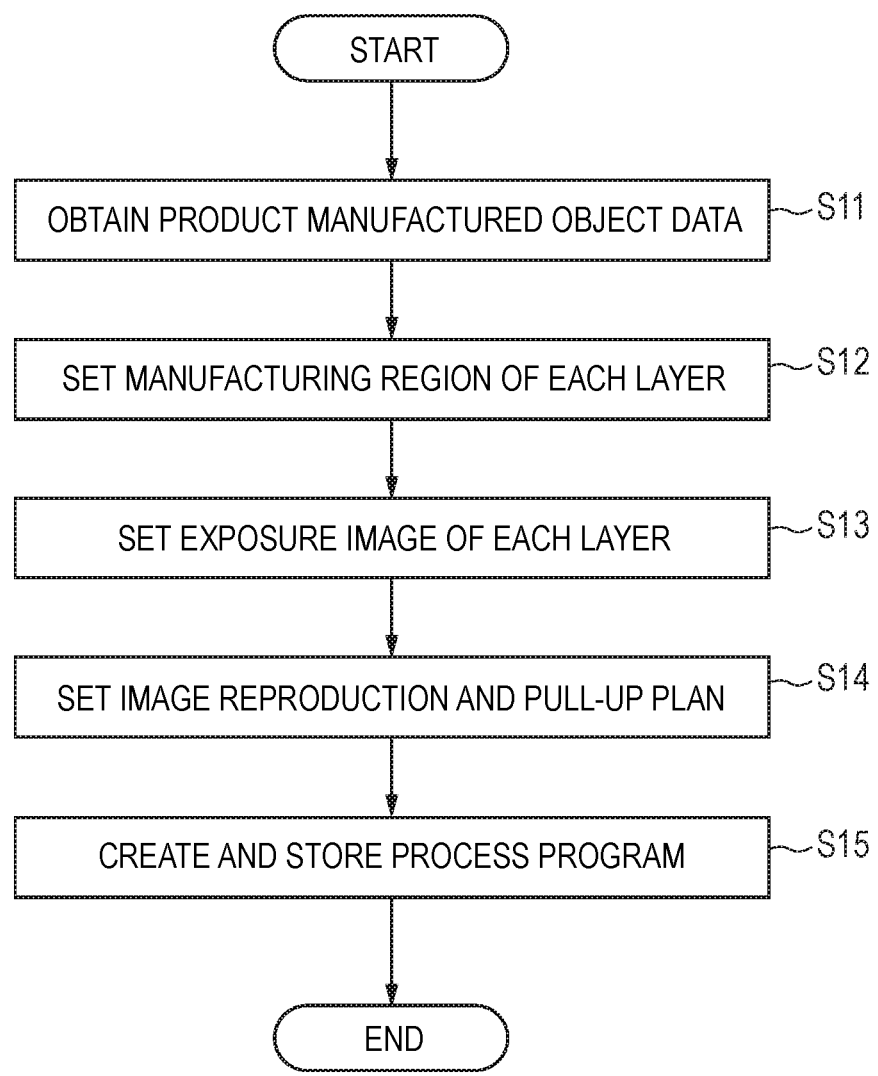

ADDITIVE MANUFACTURING APPARATUS

CROSS-REFERENCE TO RELATED APPLICATIONS

This application is a Continuation of International Patent Application No. PCT/JP2017/006458, filed Feb. 22, 2017, which claims the benefit of Japanese Patent Application No. 2016-046345, filed Mar. 9, 2016, and Japanese Patent Application No. 2017-016261, filed Jan. 31, 2017, all of which are hereby incorporated by reference herein in their entirety.

BACKGROUND OF THE INVENTION

Field of the Invention

The present invention relates to an additive (three-dimensional) manufacturing apparatus which manufactures a three-dimensional manufactured (modeled) object by projecting an exposure image into a photosetting (photocurable) liquid resin material.

Description of the Related Art

In recent years, an additive manufacturing apparatus for manufacturing a three-dimensional manufactured object by laminating solidified layers formed by exposing a photosetting liquid resin material is being developed. In the additive manufacturing apparatus in which the solidified layer formed by exposing the surface layer of the resin material is moved downward and laminated, there is a problem that a manufacturing speed in a laminating direction is low (U.S. Patent Application Publication No. 2015/54198).

On the other hand, in U.S. Pat. No. 9,216,546, there is proposed an additive manufacturing apparatus which can manufacture at a relatively high speed a three-dimensional manufactured object by pulling up a solidified layer solidified by an exposure image while projecting the exposure image for solidifying a resin material into the resin material through a bottom surface of a vessel.

The additive manufacturing apparatus which projects the exposure image into the resin material comprises an image projecting unit (so-called a projector) for projecting the exposure image formed by an image forming element into the resin material by using a projection optical system. In the additive manufacturing apparatus like this, a range of the cross section perpendicular to a manufacturing direction of the product manufactured object is limited to an area where the exposure image can be projected by the projection optical system.

Here, if a projection magnification of the projection optical system is increased, the manufacturing area is also increased. However, in this case, since a pixel of the projection image is enlarged, manufacturing resolution of the product manufactured object is lowered. If it is attempted to enlarge the manufacturing area without increasing the projection magnification of the projection optical system, a large-sized and high-definition image forming element and a large-aperture projection optical system are required, so that a manufacturing cost of the additive manufacturing apparatus is increased.

In view of this, it has been proposed to arrange a plurality of image projecting units so as to face the bottom surface of the vessel, and to join respective projection regions of the image projecting units to secure a large manufacturing area. However, in a case where additive (three-dimensional) manufacture is performed using the plurality of image projecting units by dividing the exposure image of the product manufactured object, it turns out that, in a boundary region of the projection images of the adjacent image projecting units, a streak pattern and/or a slit are/is made in the manufacturing direction on the surface of the product manufactured object.

It is an object of the present invention to provide an additive manufacturing apparatus in which a streak pattern and/or a slit in a manufacturing direction are/is difficult to be made on the surface of a product manufactured object in a boundary region of projection regions of exposure images.

SUMMARY OF THE INVENTION

An additive manufacturing apparatus according to the present invention is characterized by comprising: a vessel configured to hold a photosetting liquid resin material and have an incident surface through which an exposure image for solidifying the resin material is incident into the resin material; a first image projecting unit configured to make a first exposure image incident from the incident surface and project the incident first exposure image into the resin material; a second image projecting unit configured to make a second exposure image, continuous with the first exposure image, incident from the incident surface and exposure the incident second exposure image into the resin material; a moving unit configured to move a manufacturing layer manufactured by solidifying the resin material by the first exposure image and the second exposure image, away from the incident surface; and a controlling unit configured to adjust a boundary region between a first projection image obtained by projecting the first exposure image into the resin material by the first image projecting unit and a second projection image obtained by projecting the second exposure image into the resin material by the second image projecting unit.

Further features of the present invention will become apparent from the following description of exemplary embodiments with reference to the attached drawings.

BRIEF DESCRIPTION OF THE DRAWINGS

FIG. 3 is a flowchart for describing creation of a manufacturing process program.

FIG. 4A is a side view.

FIG. 4B is a plan view.

FIG. 4C is a front view.

FIG. 8A shows a state before correction.

FIG. 8B shows a state after correction.

FIG. 10A shows a state before correction.

FIG. 10B shows a state after correction.

FIG. 12A shows a state before correction.

FIG. 12B shows brightness correction.

FIG. 12C shows a state after correction.

FIG. 13A shows the projection surface.

FIG. 13B shows the deflection of a transmitting member.

FIG. 16A shows a deflection state of the transmitting member.

FIG. 16B shows an oxygen supplying system.

FIG. 17A shows the exposure image of the product manufactured object.

FIG. 17B shows the exposure image of one projection region.

FIG. 17C shows the exposure image of the other projection region.

FIG. 19A shows a positioning image.

FIG. 19B shows an alignment plate.

FIG. 22A shows an intermediate position of a projection optical system.

FIG. 22B shows the outside of the manufacturing region.

FIG. 24A shows an embodiment in which manufacture is performed in a downward direction.

FIG. 24B shows an embodiment in which manufacture is performed in a horizontal direction.

DESCRIPTION OF THE EMBODIMENTS

Hereinafter, preferred embodiments of the present invention will be described in detail with reference to the attached drawings.

Embodiment 1

Figure 1:
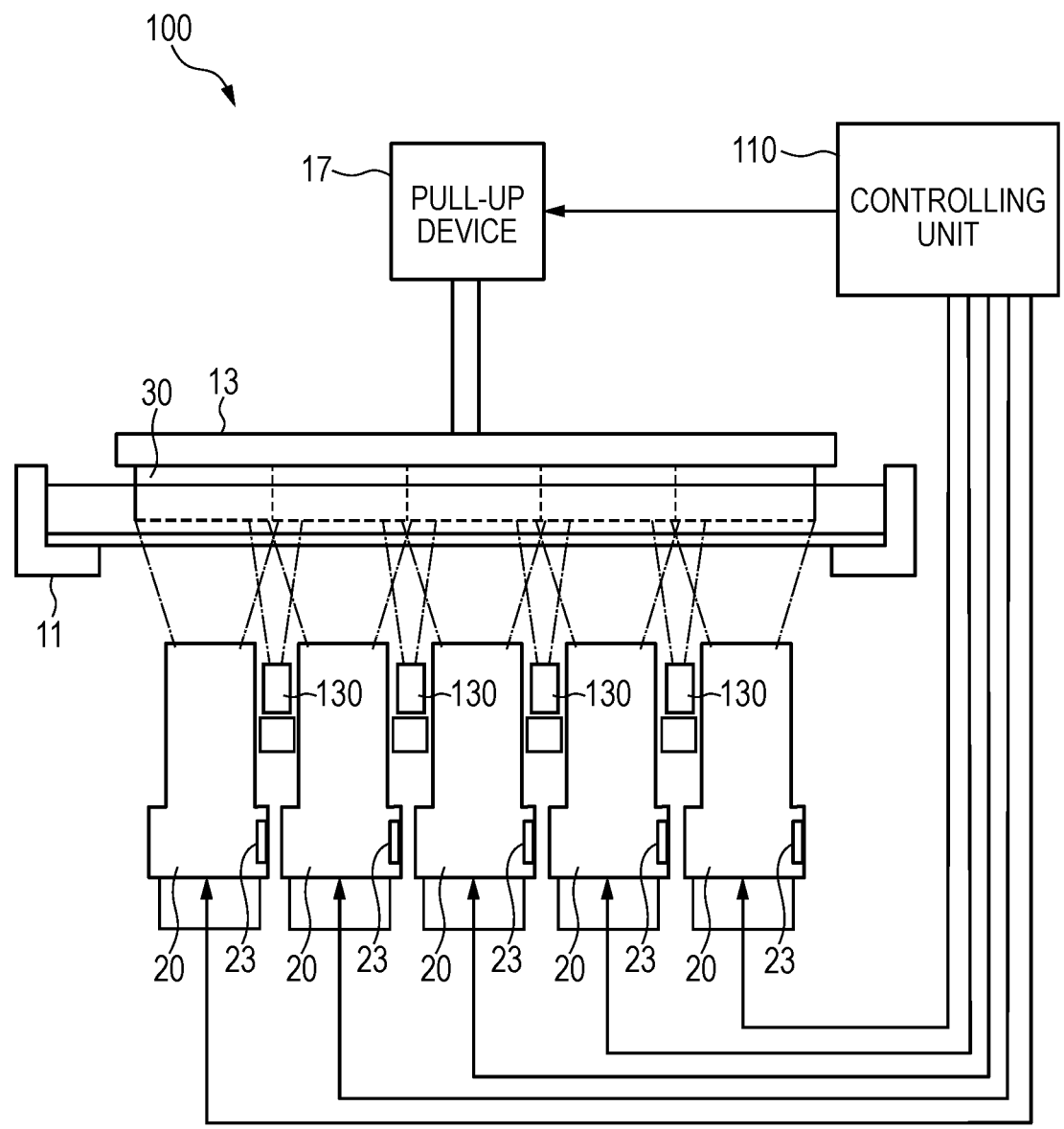
FIG. 1 is an explanatory diagram for describing of a constitution of an additive manufacturing apparatus according to Embodiment 1.

As illustrated in FIG. 1, in Embodiment 1, a manufacturing area of 500 mm×500 mm is secured by using 5 projectors×5 projectors. Then, a boundary region of adjacent projection regions is photographed by a camera 130, and an overlap of the projection regions in the boundary region is mechanically adjusted based on a photographed image.

(Additive Manufacturing Apparatus)

Figure 2:
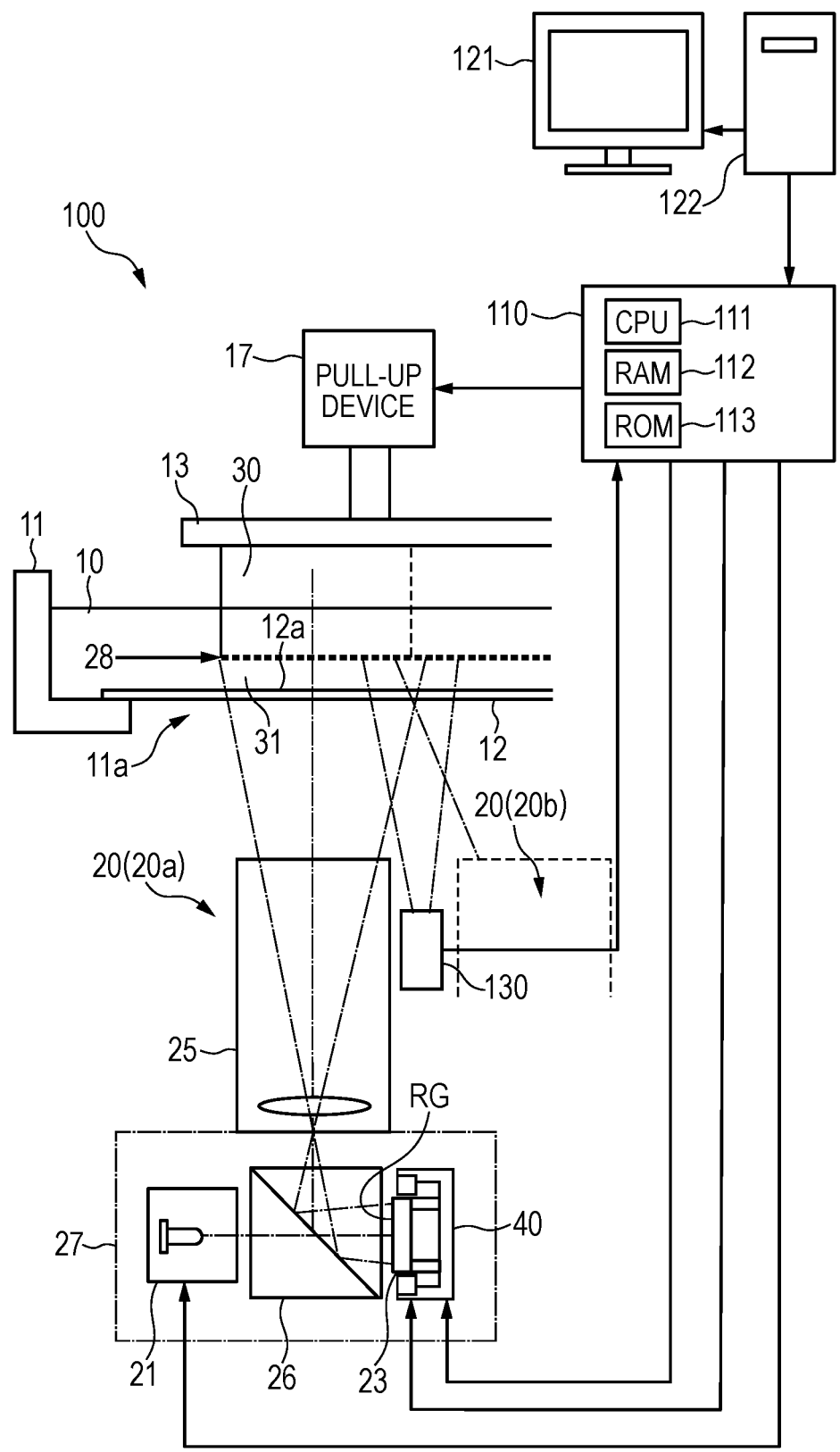
FIG. 2 is an explanatory diagram for describing a constitution of a projector.

FIG. 1 is an explanatory diagram for describing a constitution of an additive manufacturing apparatus according to Embodiment 1. FIG. 2 is an explanatory diagram for describing a constitution of a projector. As illustrated in FIG. 1, an additive manufacturing apparatus 100 projects an exposure image into a resin material in a vessel 11 by using 5×5 projectors 20, thereby manufacturing a product manufactured object 30 which is as an example of an additive manufacture.

As illustrated in FIG. 2, the vessel 11 serving as an example of a vessel holds a photosetting liquid resin material 10, and has an incident surface through which the exposure image is incident into the resin material. The vessel 11 has a transmitting portion 11a which is an opening for projecting the exposure image into the vessel. A transmitting member 12 is attached to the transmitting portion 11a to hold the photosetting liquid resin material 10 so as not to leak.

A pull-up member 13 and a pull-up device 17, which are examples of a moving unit, move a manufacturing layer manufactured by solidifying the resin material by projectors 20a and 20b away from an incident surface 12a. The pull-up member 13 is pulled upward at an arbitrarily set speed or an arbitrarily set pitch and time interval by the pull-up device 17 operated by a pulse motor and a ball screw. The pull-up member 13 is made by a material that the cured resin material 10 can be attached to and separated from, and has a surface shape from which the resin material can easily be separated.

Figure 6:
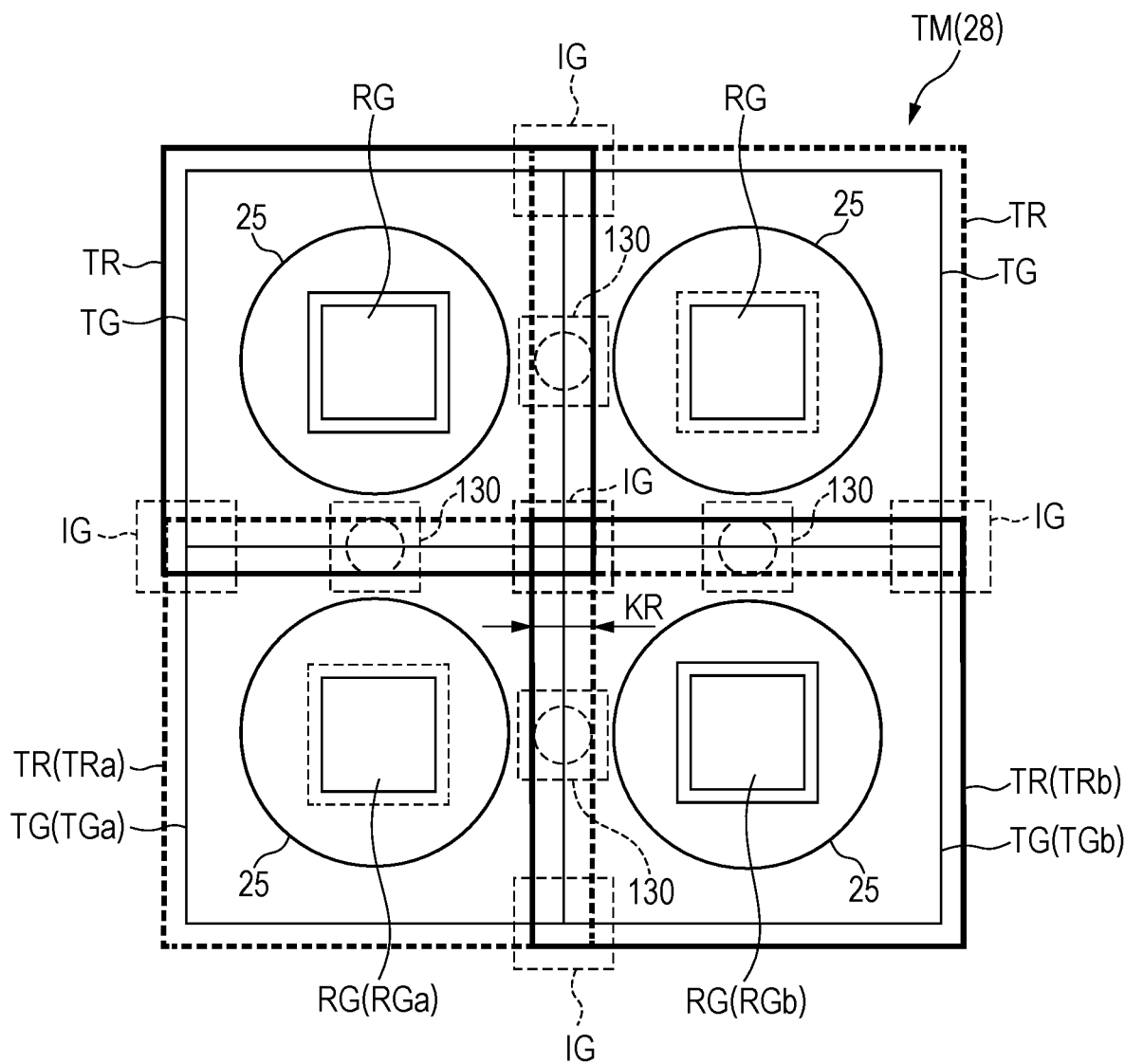
FIG. 6 is an explanatory diagram for describing a boundary region of a projection image.

The projector 20 projects an exposure image RG formed on the surface of an image forming element 23 into the resin material 10 in the vessel 11. The exposure image RG is formed at an image forming position 28. The projector 20a, which is an example of a first image projecting unit, makes a first exposure image (RGa: FIG. 6) incident from the incident surface 12a and projects the incident image into the resin material. The projector 20b is an example of a second image projecting unit, makes a second exposure image (RGb: FIG. 6), which is continuous with the first exposure image, incident from the incident surface 12a, and projects the incident image into the resin material 10. As described later, the projector 20a can move in a plane, adjust a projection magnification and adjust a focal position, by an individual remote operation.

(Image Forming Element)

The image forming element 23 forms the exposure image which is illuminated by a light source 21 being an example of an illuminating unit. The light source 21 generates ultraviolet rays by an ultraviolet LED (light-emitting diode) and illuminates the image forming element 23 with the generated ultraviolet rays. A projection optical system 25 projects the exposure image formed by the image forming element 23 into the resin material 10 through the incident surface 12a.

The image forming element 23 is a light modulating element for forming an image corresponding to image data on its surface. The image forming element 23 is formed by arranging minute movable mirrors corresponding to respective pixels in a lattice pattern, and outputs a reflected image of illumination light by the light source 21. The image forming element 23 adopts a DMD (digital mirror device) element of DLP9000™ from Texas Instruments Incorporated, in consideration of high efficiency of utilization of ultraviolet light.

The projection optical system 25 projects a binary image formed on the surface of the image forming element 23 so as to be imaged at the image forming position 28 which is a conjugate position with the exposure image RG on a projection optical path of the exposure image. A projection magnification of the projection optical system 25 is 10 times, and this system magnifies and displays one pixel of 7.6 μm square formed on the image forming element 23 to a pixel of 76 μm square projected on the projection image.

A mirror of each pixel of the image forming element 23 may be simply turned ON/OFF in synchronization with switching of the exposure image RG. However, a brightness gradation (intensity modulation amount) may be set for each pixel constituting the exposure image. The image forming element 23 can turn ON/OFF (change a reflection angle) of the mirror of each pixel 250 times per second within the range of a duty ratio of 0% to 100%. It is also possible to output halftone (gray scale) of the pixel by individually setting the duty ratio of ON to the mirror of each pixel.

(Transmitting Member)

The transmitting member 12 is a fluororesin material which has a property of transmitting oxygen and ultraviolet light and has a substantially transparent appearance with a thickness of 2 mm. More specifically, Teflon™ AF 2400 from DuPont-Mitsui Fluoroproducts Co., Ltd. is used, and a transmissivity of the light source 21 to ultraviolet light is 88%.

The transmitting member 12 transmits oxygen in the air and forms an oxygen-rich atmosphere at the interface with the resin material 10, thereby preventing a radical polymerization reaction due to ultraviolet rays of the resin material 10. Thus, a thin liquid layer (so-called a dead zone) 31 of the resin material 10 is formed between the product manufactured object 30 and the transmitting member 12, and the product manufactured object 30 is pulled upward without attachment to the transmitting member 12.

That is, the resin material 10 which is used in Embodiment 1 is the resin material which undergoes the radical polymerization reaction by ultraviolet light and solidifies, and which prevents from undergoing the radical polymerization reaction in an oxygen-rich environment. For example, a photosetting polyurethane, a photosetting epoxy resin, a photosetting urethane, a photosetting silicone rubber or the like is used.

(Controlling Unit)

A controlling unit 110 is a computer which holds, in a RAM (random access memory) 112, a processing program and data recorded in a ROM (read-only memory) 113, and performs calculation and process necessary for a CPU (central processing unit) 111. The controlling unit 110 is an additive manufacturing controller which operates the additive manufacturing apparatus 100 by executing a manufacturing process program generated by an external computer 122.

The controlling unit 110 continuously or intermittently pulls up by the pull-up device 17 the pull-up member 13 at a speed linked to a reproduction speed of a moving image, while outputting to the image forming element 23 the moving image obtained by arranging images of the respective layers of the product manufactured object 30 in time series. Thus, the product manufactured object 30 of which the upper end is fixed to the pull-up member 13 is three-dimensionally manufactured so as to grow upward.

(Manufacturing Process Program)

FIG. 3 is a flowchart for describing creation of a manufacturing process program. As illustrated in FIG. 2, an external computer 121 inputs design data of the product manufactured object 30 to the controlling unit 110, and instructs the controlling unit 110 to start, interrupt and the like of the manufacture of the product manufactured object 30. The controlling unit 110 has installed software for automatically creating a manufacturing program of the product manufactured object 30 based on the design data of the product manufactured object 30.

As illustrated in FIG. 3, the CPU 111 obtains the design data (CAD (computer-aided design) data) of the product manufactured object 30 from the external computer 121 (S11). Based on the design data of the product manufactured object 30, the CPU 111 sets a manufacturing region of the product manufactured object 30 per predetermined height, and divides it into manufacturing regions of the respective projectors 20 (S12).

The CPU 111 sets an exposure image of the photosetting resin material for each manufacturing region of each projector 20 per predetermined height (S13). The CPU 111 sets a switching interval (i.e., moving image reproducing speed) of the exposure image of the image forming element 23 and a pull-up plan of the pull-up member 13 by the pull-up device 17 (S14). The CPU 111 combines the switching plan of the exposure image of the image forming element 23 and the pull-up plan of the pull-up member 13 with each other to create the manufacturing process program of the product manufactured object 30, and stores the created program in the RAM 112 (S15). The manufacturing process program and attached data are transmitted to the external computer 121 and stored in a recording medium.

Incidentally, the process of dividing the projection image according to the projection region (TR: FIG. 6) for each projector 20 may be performed by the external computer 121.

(Projector)

As illustrated in FIG. 2, the projector 20 projects the exposure image formed by the image forming element 23 into the resin material 10 by the projection optical system 25. In a case where the number of the projectors 20 is one, an area of the cross section perpendicular to the manufacturing direction of the product manufactured object 30 is a manufacturing area that the projection optical system 25 can project the exposure image.

As the projection magnification of the projection optical system 25 increases, the manufacturing area increases. However, in this case, since the pixel of the projection image increases, manufacturing resolution of the product manufactured object 30 decreases. In order to enlarge the manufacturing area without increasing the projection magnification of the projection optical system 25, a large-sized high-definition image forming element 23 and a large-aperture projection optical system 25 corresponding to the large manufacturing area are required, thereby greatly increasing a manufacturing cost of the additive manufacturing apparatus 100.

Therefore, in the additive manufacturing apparatus 100, as illustrated in FIG. 1, the 25 projectors 20 of 5 units×5 units are arranged in a lattice shape so as to face the bottom surface of the vessel 11, and the 25 projection regions are joined together in a lattice shape, thereby securing the large manufacturing area. However, when the 25-divided exposure images are simply projected by the 25 projectors 20 to perform the additive manufacture, a streak pattern and/or a slit in the manufacturing direction are/is made (manufactured) at the position of the product manufactured object 30 corresponding to the boundary region of the divided projection images.

Therefore, in Embodiment 1, the boundary region of the divided projection images is photographed by the camera 130, and the position adjustment of the individual image forming element 23 is performed based on the photographed image. Thus, the boundary region of the adjacent projection images obtained by projecting the divided exposure images is adjusted to reduce a shift (deviation) between the pixels of the adjacent projection images.

That is, if an enlargement magnification of the projection optical system 25 is increased in order to form the large product manufactured object 30, the resolution of the manufactured object inevitably decreases. Therefore, in order to form the large-sized and high-resolution product manufactured object 30, it is necessary to use the plurality of projection optical systems 25 and to join the respective projection images together for the manufacture. However, when the manufacture is performed by joining together the respective projection images of the plurality of projection optical systems 25, there is a case where the projection images are not smoothly connected due to a shift of the projection image at the boundary between the adjacent projection images, a difference in an exposure amount, or the like. In a case where the projection images are not smoothly connected, steps, streaks, slits or the like which are not present in the design data (three-dimensional structure data) of the product manufactured object 30 are made in the portion of the product manufactured object 30 corresponding to the boundary of the projection images, so that shape accuracy decreases. Therefore, in order to make a joint of the projection image TG on the projection surface TM (=manufacturing surface) invisible, it is necessary to correct the positional shift between the adjacent projection images and make a light amount distribution uniform.

In case of projecting the individual exposure image RG obtained by dividing the whole exposure image by the plurality of projectors 20, when there is a positional shift of an image pattern on the boundary between adjacent projection images TG, three causes, i.e., (1) the position to which the image is to be projected is shifted, (2) a difference in magnification of the image occurs, and (3) the image itself is distorted, are conceivable. In Embodiment 1, it aims to reduce the cause (1) the shift of the position to which the image is to be projected. Accordingly, the cause (2) the difference in magnification of the image and the cause (3) the distortion of the image itself will be described later.

As illustrated in FIG. 6 with reference to FIG. 2, the camera 130, which is an example of an image information obtaining unit, is provided between the adjacent projection optical systems 25 to obtain a photographed image of a boundary region KR of the projection image TG. In Embodiment 1, a positional shift amount of the exposure image RG for each projector 20 is measured based on the photographed image obtained by the camera 130. In Embodiment 1, a positioning image IG, which is an example of a positioning mark provided outside the manufacturing region of a projection surface TM, is used during actual exposure. The positioning image IG projected onto the interface between the resin material 10 and the transmitting member 12 is photographed and imaged by the camera 130, thereby obtaining imaging data. The transmitting member 12 is a window into which the projection image from the projection optical system 25 is incident, and which has a refractive index different from that of the resin material (monomer material) 10 in the vessel 11.

(Aligning Mechanism)

Figure 4A:
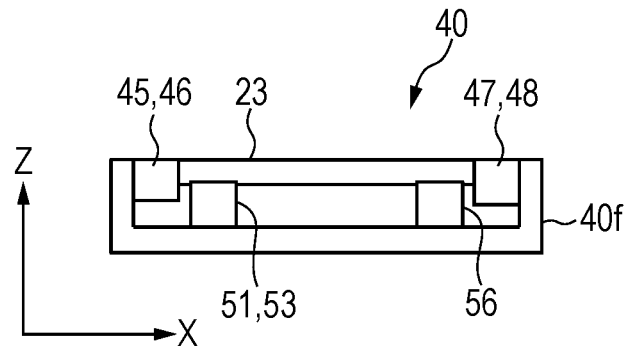
FIG. 4A is an explanatory diagram for describing an aligning mechanism of an image forming element. Here.
Figure 4B:
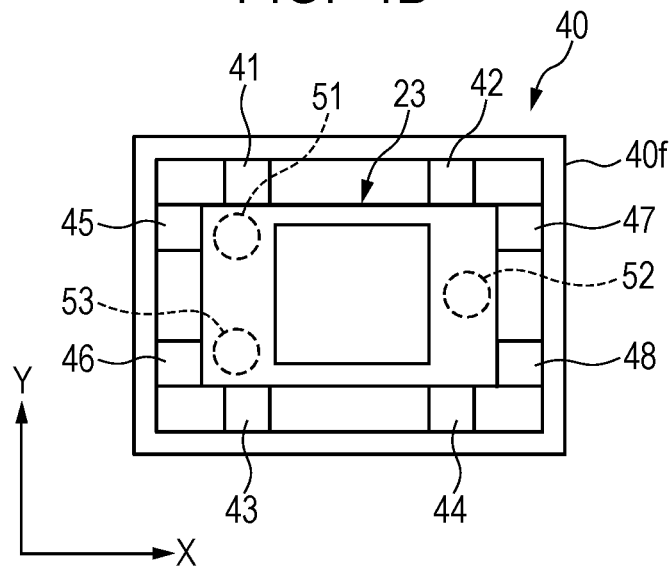
FIG. 4B is an explanatory diagram for describing the aligning mechanism of the image forming element. Here.
Figure 4C:
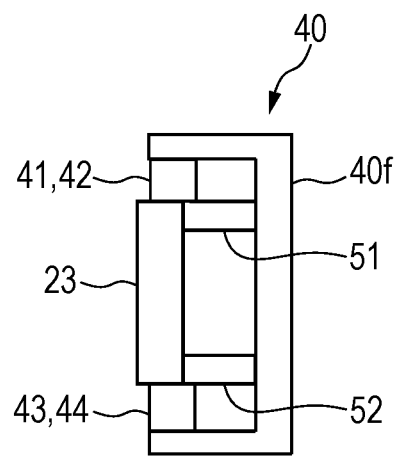
FIG. 4C is an explanatory diagram for describing the aligning mechanism of the image forming element. Here.

FIGS. 4A to 4C are explanatory diagrams for describing an aligning mechanism of the image forming element 23. More specifically, FIG. 4A is the side view, FIG. 4B is the plan view and FIG. 4C is the front view of the aligning mechanism. As illustrated in FIGS. 4A to 4C, an image displaying unit 40 movably holds the image forming element 23 by actuators 41 to 48 and 51 to 53 using piezoelectric elements, inside a box-shaped casing 40f Each of the actuators 41 to 48 and 51 to 53 expands and contracts in accordance with an applied DC (direct current) voltage.

The actuators 41 to 48, which are examples of an adjusting unit, are capable of adjusting the position of the image forming element 23 in a plane intersecting the projection optical axis of the exposure image. The controlling unit 110 can adjust a relative position in the boundary region KR between the two adjacent projection images TG, by controlling the actuators 41 to 48. The actuators 41, 42, 43 and 44 can move the image forming element 23 in a Y direction by properly combining the expansions and the contractions of the respective actuators. Besides, the actuators 45, 46, 47 and 48 can move the image forming element 23 in an X direction by properly combining the expansions and the contractions of the respective actuators. Besides, the actuators 41, 42, 43, 44, 45, 46, 47 and 48 can perform angle adjustment by rotating the image forming element 23 in an XZ plane by properly combining the expansions and the contractions of the respective actuators.

The actuators 51, 52 and 53 can move the image forming element 23 in a Z direction by integrally expanding and contracting. Besides, the actuators 51, 52 and 53 can perform angle adjustment of the image forming element 23 in the XZ plane and in an YZ plane by properly combining the expansions and the contractions of the respective actuators.

The controlling unit (110; FIG. 2), which is an example of a controlling unit, calculates a shift amount of the pixels in the adjacent two projection images by processing the photographed images photographed by the camera 130, and operates the actuators 41 to 48 so as to cancel the calculated shift amount.

(Aligning Control)

Figure 5:
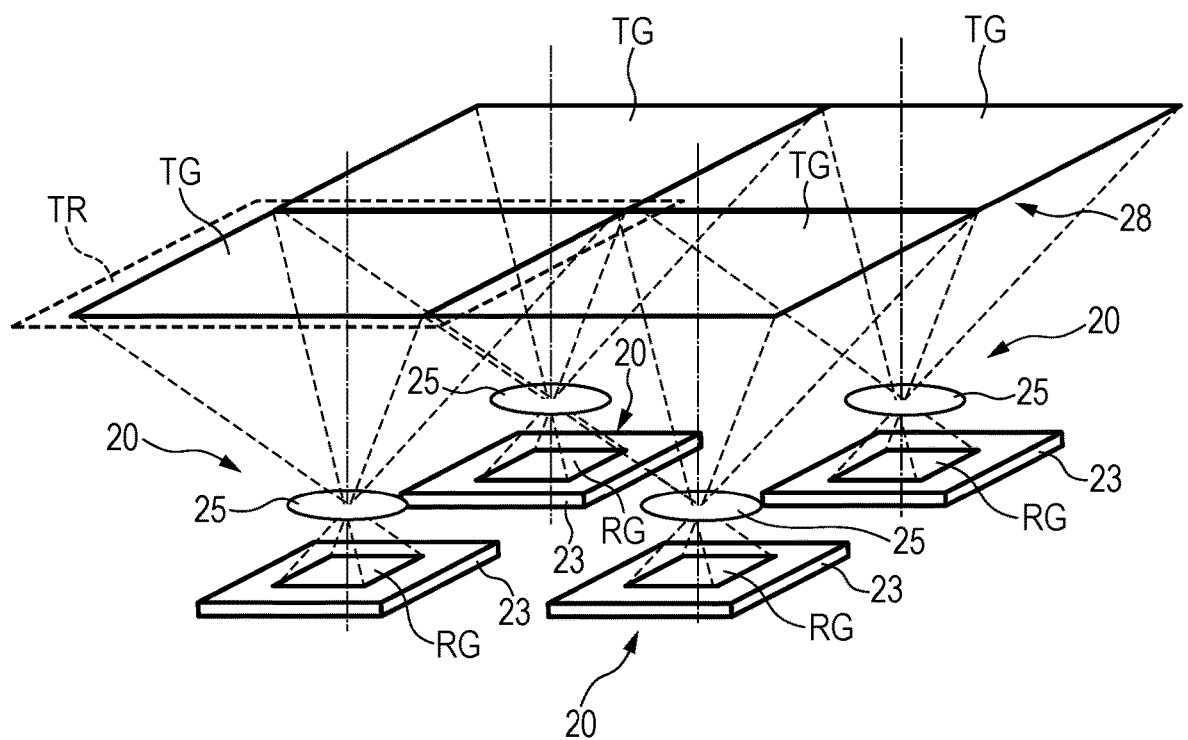
FIG. 5 is a schematic diagram for describing a projection region of the projector.

FIG. 5 is a schematic diagram for describing the projection region of the projector, and FIG. 6 is an explanatory diagram for describing the boundary region of the projection image. As illustrated in FIG. 2, the camera 130, which is an example of a photographing unit, photographs the boundary region KR from the outside of the vessel 11. The controlling unit 110 adjusts the boundary region (KR: FIG. 6) between a first projection image (TGa: FIG. 6) obtained by projecting the first exposure image (RGa: FIG. 6) by the projector 20a and a second projection image (TGb: FIG. 6) obtained by projecting the second exposure image by the projector 20b.

The four adjacent projectors 20, which are taken out from the additive manufacturing apparatus 100 illustrated in FIG. 1, will be explained hereinafter. As illustrated in FIG. 5, the four projectors 20 respectively project the quadrupled exposure images RG to form the projection images TG at the image forming position 28. The projection image TG is set inside the projection region TR of the projector 20.

As illustrated in FIG. 6, the projection regions TR of the four projectors 20 overlap at the boundary region KR. The adjacent projection images TG are joined together such that each image includes the half of the boundary region KR. The controlling unit (110: FIG. 2) adjusts the positions, inclination angles, illuminances and the like of the adjacent projection images TG in the boundary region KR, based on the photographed image of the boundary region KR by the camera 130. Although the width of the boundary region KR is exaggerated in FIG. 6, actually, this region is merely an overlap of about 10 pixels (0.75 mm).

The camera 130 is disposed to face the boundary region KR of the adjacent projection regions TR and to be able to set the two positioning images IG projected on the projection region TR in an angle of view. The camera 130 photographs the positioning image IG when adjusting the position of the projection region before the start of the manufacture, and, after starting the manufacture, photographs an image obtained by projecting the exposure image RG of the product manufactured object 30 onto the projection region TR.

The camera 130 is used for projection image measurement. The camera 130 obtains the image data of the projection image TG at a sampling rate which is twice or more a frame rate of the image forming element 27, in synchronization with the frame rate of an image forming element 27. The camera 130 obtains position information and illuminance information of the image pattern of the projection image TG located in the boundary region KR.

In Embodiment 1, the camera 130 has an imaging element sensitive to ultraviolet light, and photographs the interface between the resin material 10 and the transmitting member 12 and an image of reflected light based on a refractive index difference of ultraviolet light in the product manufactured object 30. However, it is also possible to use the camera 130 which has an imaging element sensitive to visible light. For this purpose, as described later, the light source 21 is temporarily switched to a visible light source at photographing timing, or visible light is overlapped on ultraviolet light. Besides, it is possible to convert ultraviolet light into visible light by mixing a fluorescent agent with the resin material, so that the projection image TG can be observed with visible light. As described later, it is possible by remotely operating the camera 130 individually to adjust the position in a planar direction, and adjust a focal position.

As illustrated in FIG. 4B, by moving the image forming element 23 in an XY plane, the projection image TG moves within the plane of the image forming position 28. By inclining the image forming element 23 in the XY plane, the inclination angle of the projection image TG is adjusted within the plane of the image forming position 28. As illustrated in FIG. 2, the CPU 111 divides the entire projection image of each layer to be formed, which is created from the design data of the product manufactured object 30, into the projection image TG of each projector 20. The CPU 111 prepares a large number of photographed images (so-called FLIP BOOK) grouped in time series for each projector 20 to which the divided exposure image is allocated, and waits for start of manufacture.

Here, in a modification of Embodiment 1, the camera 130 sensitive to an infrared light region is used in place of the camera 130 sensitive to the ultraviolet region. Generally, since the radical polymerization reaction of a resin monomer is a considerable exothermic reaction, the manufacturing region of the product manufactured object 30 in which solidification of the resin material is progressing in the projection image TG is an infrared ray source. By performing focusing and photographing of the image forming position 28 using the camera 130 sensitive to the infrared light region, an image having a manufacturing contour of the high-contrast product manufactured object 30 in which the illuminance of the manufacturing region is emphasized with respect to a non-manufacturing region is obtained. Thus, it is possible to detect a shift and a gap of the adjacent projection images TG in the boundary region KR with high resolution.

(Flowchart)

Figure 7:
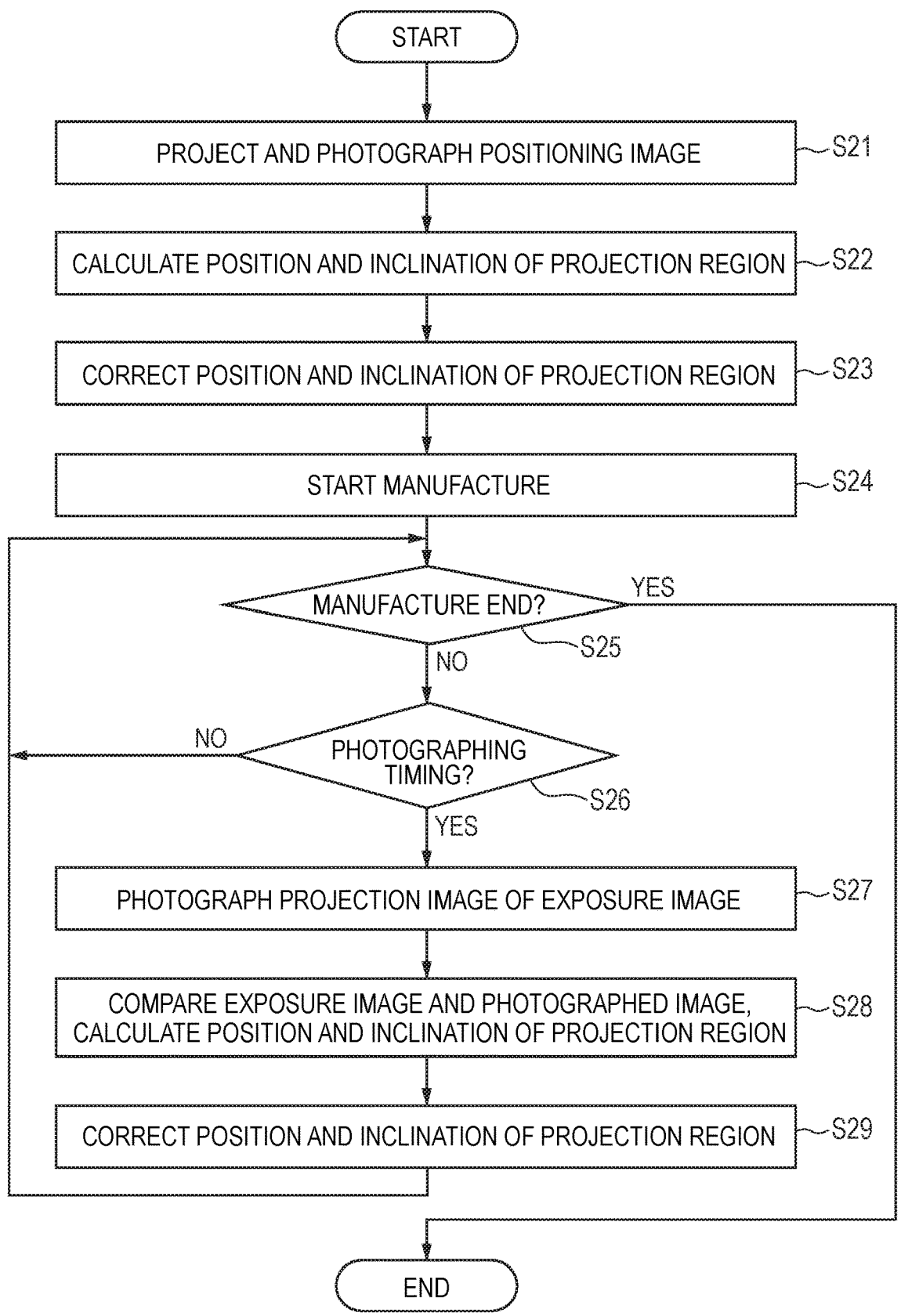
FIG. 7 is a flowchart for describing shift (deviation) correction control of a projection image according to Embodiment 1.
Figure 8A:
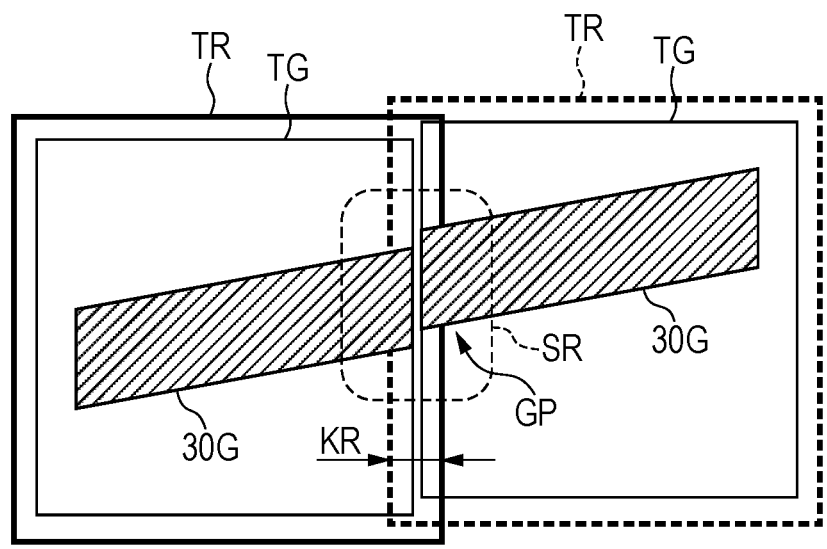
FIG. 8A is an explanatory diagram for describing movement of the projection region. More specifically.
Figure 8B:
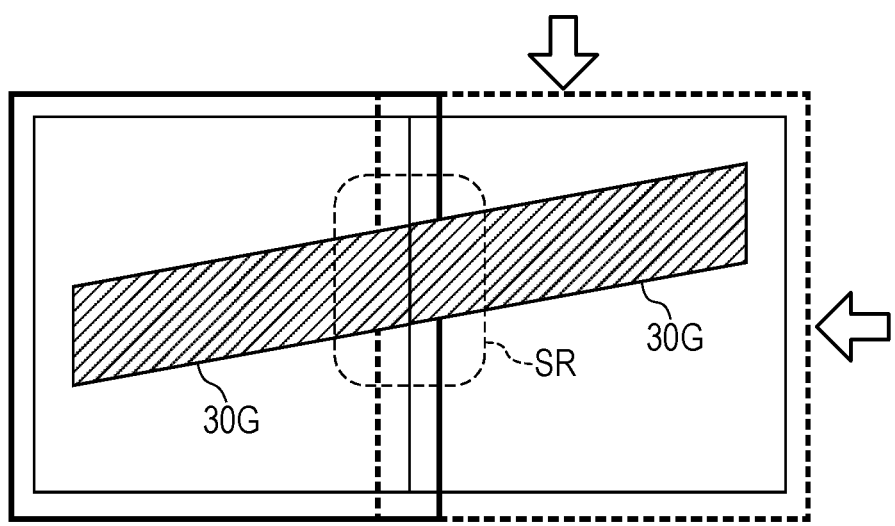
FIG. 8B is an explanatory diagram for describing the movement of the projection region. More specifically.

FIG. 7 is a flowchart for describing shift (deviation) correction control of the projection image according to Embodiment 1. FIGS. 8A and 8B are explanatory diagrams for describing the movement of the projection region. More specifically, FIG. 8A shows the projection region before the correction, and FIG. 8B shows the projection region after the correction. The CPU 111 photographs the boundary region KR by the camera 130 by performing a photographing process during the manufacture of the product manufactured object 30. In an adjusting step following the photographing step, the CPU 111 adjusts the alignment of the boundary region KR by photographing the boundary region KR during the manufacture of the product manufactured object 30.

As illustrated in FIG. 7, when it is instructed to start the manufacture from the external computer 121, the CPU 111 starts the shift correction control of the projection image TG. The CPU 111 displays a positioning mark on the image forming element 23, and forms the positioning image IG at the image forming position 28 as illustrated in FIG. 6. Then, the camera 130 photographs the positioning image IG and captures the photographed image (S21).

Incidentally, although the positioning image IG solidifies the resin material 10 on the pull-up member 13, it does not become a problem because it is before the manufacture of the product manufactured object 30. However, as for the positioning image IG, it is possible to avoid an unnecessary polymerization reaction of the resin material 10 by lowering the brightness gradation (ON duty) of the pixel in the image forming element 23 and finishing the process in a short time.

The CPU 111 processes the photographed image of the positioning image IG, and calculates a positional shift correction amount and an inclination correction amount of the individual projection region TR (S22). The CPU 111 causes the actuators 41 to 48 to operate to correct the positional shift and the inclination of the individual projection region TR (S23). After correcting the positional shift and the inclination of the projection region TR, the CPU 111 starts the manufacture (S24).

As illustrated in FIG. 8A, after the start of the manufacture, an image process of comparing the photographed image with the exposure image in the boundary region is performed, so that a rupture (breakage) in the boundary region KR of a product projection image 30G, in which the exposure image of the product manufactured object 30 is projected onto the projection region TR, is detected. Then, when the rupture is detected, the actuators 41 to 48 are operated to adjust the position of the projection region as indicated by white arrows in FIG. 8B.

After the start of the manufacture, at a photographing timing of each predetermined time (1 second) (YES in S26), the CPU 111 photographs, by using the camera 130, the projection image of the exposure image projected onto the boundary region KR, and captures the photographed image (S27).

The CPU 111 compares the photographed product projection image 30G with the exposure image RG projected onto the boundary region KR to decide whether or not a gap GP is generated in the product projection image 30G. When the gap GP is generated, the CPU obtains the number of pixels in the gap GP and the number of positional shift pixels in a direction along the gap, and calculates the positional shift correction amount and the inclination correction amount of the projection region TR (S28).

The CPU 111 operates the actuators 41 to 48 to correct the positional shift and the inclination of the projection region TR (S29). When the manufacture of the product manufactured object 30 ends (YES in S25), the CPU 111 ends the shift correction control of the projection image TG.

Effect of Embodiment 1

As illustrated in FIG. 6, in Embodiment 1, the boundary region KR between the first projection image TGa on which the first exposure image RGa is projected and the second projection image TGb on which the second exposure image RGb is projected is adjusted. Therefore, it is possible to reduce a streak pattern, a swelling, a dent, a deformation, a slit and the like which are made in the product manufactured object 30 and continuous in the manufacturing direction.

In Embodiment 1, the camera 130 photographs the boundary region KR from the outside of the vessel 11. Then, based on the photographed image of the boundary region KR by the camera 130, a relative position, an inclination angle, an illuminance and the like of the two adjacent projection images TG in the boundary region KR are adjusted. Therefore, it is possible to start the control to correctly decide and eliminate the streak pattern and/or the slit in the manufacturing direction to be formed on the product manufactured object 30 at an early stage. Further, it is possible to simply constitute the photographing optical system of the camera 130.

In Embodiment 1, the position of the image forming element 23 can be adjusted within the plane where the actuators 41 to 48 cross the projection optical axis of the exposure image. Therefore, the controlling unit 110 can move the projection image TG of the exposure image RG along the projection surface TM and perform the positioning of the two adjacent exposure images RGa and RGb.

Embodiment 2

In Embodiment 1, the position and the inclination of the image forming element 23 are mechanically adjusted, and the boundary region of the adjacent projection regions is adjusted. On the other hand, in Embodiment 2, the image forming element 23 is not moved, but the position of the product manufactured object 30 on the exposure image on the image forming element 23 is corrected. Incidentally, since the mechanical constitution and the manufacturing process of the additive manufacturing apparatus 100 are the same as those in Embodiment 1, duplicate explanations are omitted.

As described above, in case of projecting the individual exposure image RG obtained by dividing the whole exposure image by the plurality of projectors 20, when there is the positional shift of the image pattern on the boundary between the adjacent projection images TG, the three causes, i.e., (1) the position to which the image is to be projected is shifted, (2) the difference in magnification of the image occurs, and (3) the image itself is distorted, are conceivable. Under the circumstances, even if the cause itself cannot be eliminated, it is possible by correcting or deforming the individual exposure image RG to eliminate the shift of the image pattern at the boundary between the adjacent projection images TG.

As illustrated in FIG. 6, in Embodiment 2, as well as Embodiment 1, the position of the image pattern included in the projection image TG in the plane of the projection surface TM is measured. Then, a difference amount of the measured position with respect to a design position of the image pattern is calculated. Then, the image data of the exposure image RG is corrected so that the position of the image pattern on the projection image TG on the projection surface TM becomes the design position.

(Correction of Exposure Image)

Figure 9:
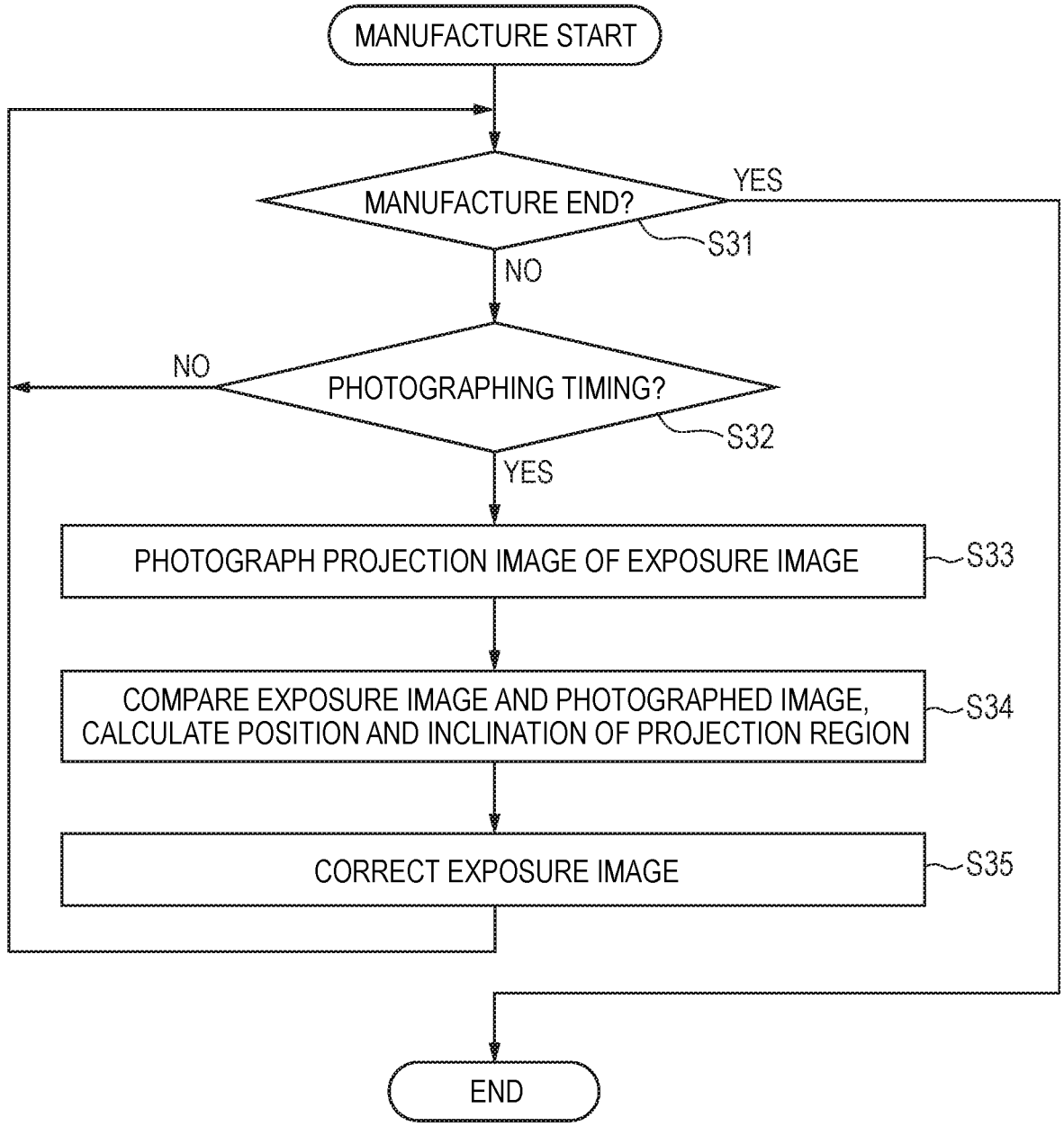
FIG. 9 is a flowchart for describing shift correction control of the projection image according to Embodiment 2.
Figure 10A:
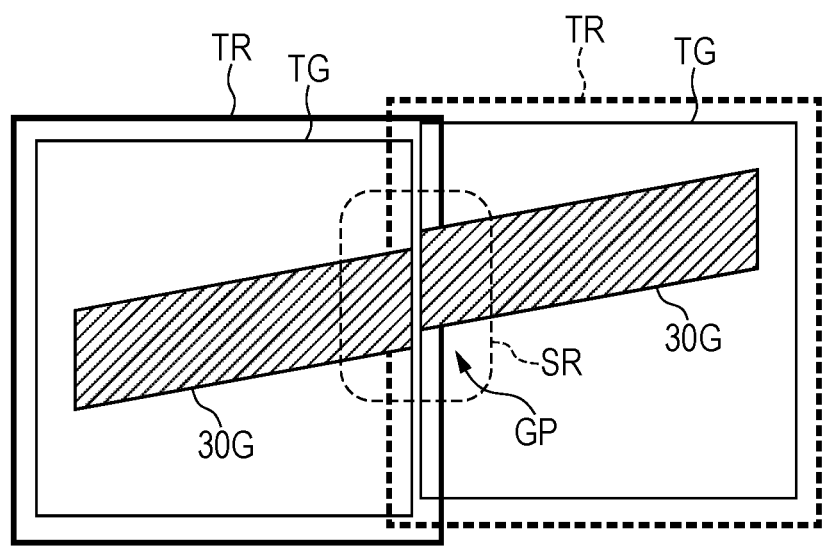
FIG. 10A is an explanatory diagram for describing correction of an exposure image. More specifically.
Figure 10B:
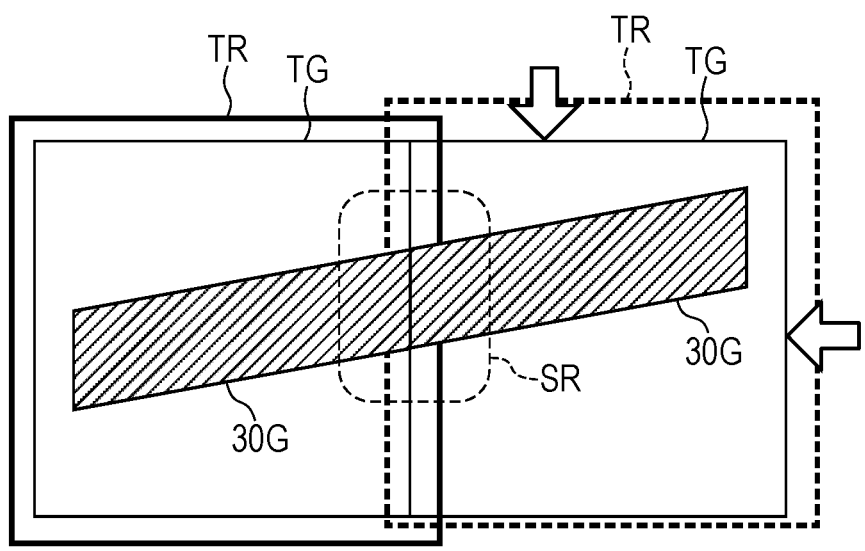
FIG. 10B is an explanatory diagram for describing the correction of the exposure image. More specifically.

FIG. 9 is a flowchart for describing shift correction control of the projection image according to Embodiment 2. FIGS. 10A and 10B are explanatory diagrams for describing correction of the exposure image. More specifically, FIG. 10A shows the exposure image before the correction, and FIG. 10B shows the exposure image after the correction. As illustrated in FIG. 6, in Embodiment 2, the image data of the first exposure image RGa or the second exposure image RGb corresponding to the boundary region KR is adjusted, thereby aligning the adjacent projection images TGa and TGb.

As illustrated in FIG. 9, after the start of the manufacture, at a photographing timing of each predetermined time (1 second) (YES in S32), by using the camera 130, the CPU 111 photographs the respective projection images TGa and TGb of the exposure images RGa and RGb projected onto the boundary region KR, and captures the photographed image (S33).

The CPU 111 compares the image located in the boundary region KR of the photographed product projection image 30G with the before-division exposure image RG projected onto the boundary region KR to decide whether or not the gap GP is generated. When the gap GP is generated, the CPU obtains the number of pixels in the gap GP and the number of positional shift pixels in the direction along the gap, and calculates the positional shift correction amount and the inclination correction amount of the projection region TR (S34).

As illustrated in FIG. 10A, if the positional shift occurs between the adjacent projection regions TR, there is case where the gap GP is generated in the product projection image 30G. At this time, in Embodiment 2, as illustrated in FIG. 10B, the individual projection region TR is not moved. Instead, the projection image TG of the exposure image RG is moved in the projection region TR as indicated by arrows, thereby canceling the gap GP. A contour position of the product manufactured object 30 in the exposure image RG displayed on the image forming element 23 is shifted by the positional shift correction amount and is inclined by the inclination correction amount.

The CPU 111 corrects the exposure image RG of each layer to be used for subsequent manufacture of the product manufactured object 30, such that the contour position of the product manufactured object in the original exposure image RG is moved by the positional shift correction amount and is inclined by the inclination correction amount (S35). When the manufacture of the product manufactured object 30 ends (YES in S31), the CPU 111 ends the shift correction control of the projection image.

As illustrated in FIG. 6, in Embodiment 2, the image data of at least one of the two exposure images RGa and RGb located in the boundary region KR where the gap GP has been generated is adjusted. Therefore, there is no need to provide a mechanism for moving the image forming element 23. Besides, vibration or noise caused by the mechanical movement of the image forming element 23 does not occur.

Embodiment 3

If the illuminances of the product projection image are different from each other across the boundary between the adjacent projection images, a streak in the manufacturing direction is made at the boundary position of the product manufactured object 30. Therefore, in Embodiment 3, adjustment for eliminating an illuminance (brightness) difference between the adjacent projection images is performed.

That is, when there is an illuminance difference between the images at the boundary between the adjacent projection images TG, (1) a performance difference of the projection optical systems 25 and (2) a performance difference of the light sources 21 are conceivable. Therefore, in Embodiment 3, the illuminance distribution on the projection surface TM of the projection image TG is measured, and the brightness gradation (duty ratio) of each pixel in the plane of the image forming element 23 is adjusted such that the illuminance distribution becomes uniform. Moreover, the brightness gradation (duty ratio) of each pixel in the plane of the image forming element 23 is controlled such that the illuminance difference of the adjacent projection images TG across the boundary is eliminated.

As described above, even if the boundary region KR has about ten pixels, when an overlap of the optical images of patterns occurs, the areas which are set that ultraviolet light is incident overlap each other and the exposure amount locally doubles. For this reason, a degree of polymerization of the resin material 10 in the relevant portion increases or the pattern dimension becomes thick, thereby causing the streak pattern in the manufacturing direction. Therefore, with regard to the region which is set that ultraviolet light is incident and in which the projection is performed so that patterns overlap each other, it is necessary to sum up the irradiation amounts of both the adjacent regions and then lower the illuminance amount of ultraviolet light such that the summed radiation amount becomes equal to the irradiation amount of the region in which patterns do not overlap each other. It is necessary to control the irradiation amount of ultraviolet light by performing duty control or the like on a pixel basis of the image forming element 23.

(Illuminance Correction)

Figure 11:
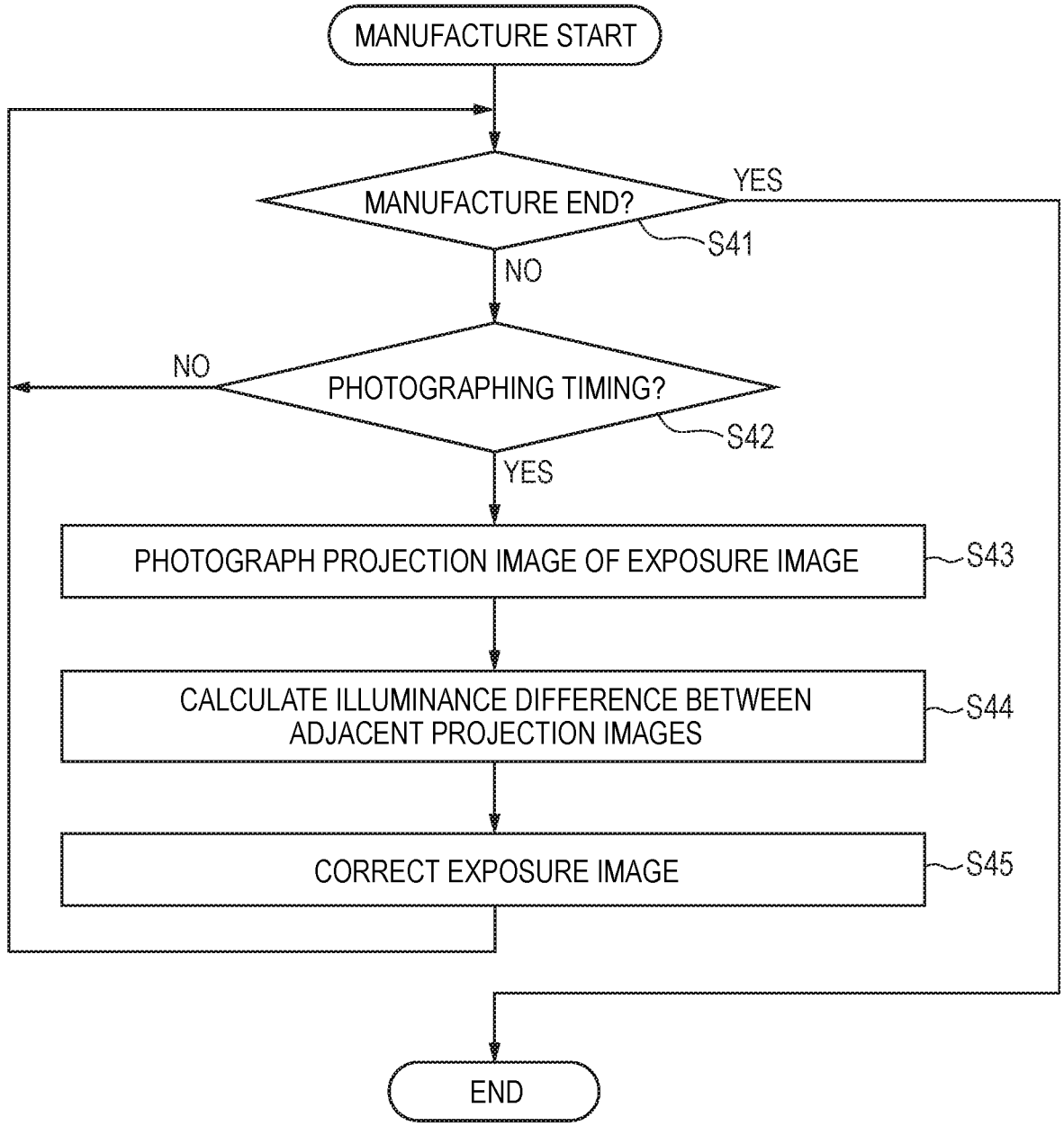
FIG. 11 is a flowchart for describing brightness correction control of the projection image according to Embodiment 3.
Figure 12A:
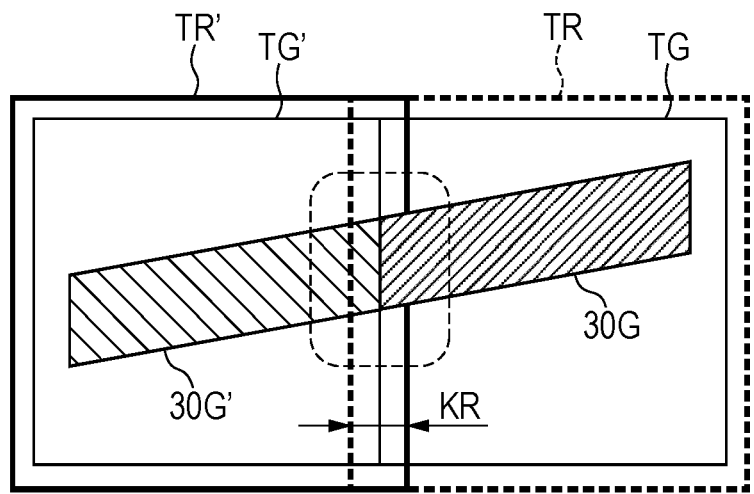
FIG. 12A is an explanatory diagram for describing correction of the exposure image. More specifically.
Figure 12B:
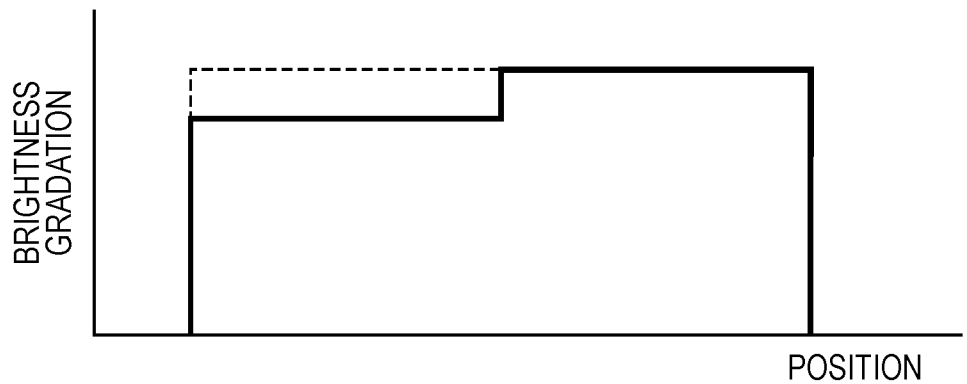
FIG. 12B is an explanatory diagram for describing the correction of the exposure image. More specifically.
Figure 12C:
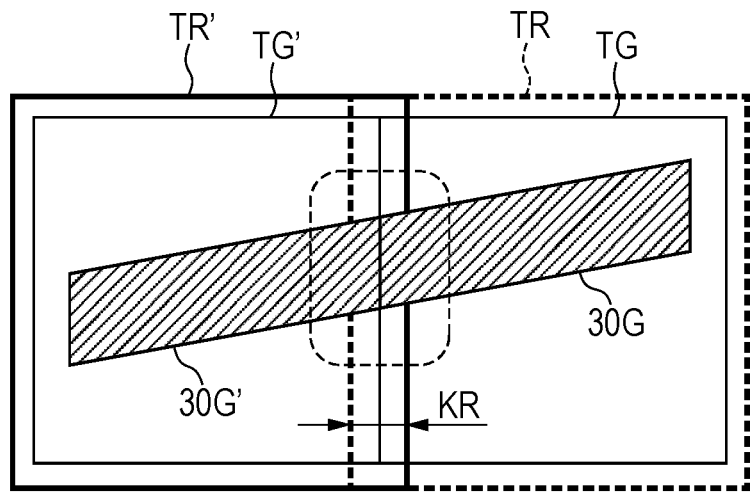
FIG. 12C is an explanatory diagram for describing the correction of the exposure image. More specifically.

FIG. 11 is a flowchart for describing of illuminance correction control of the projection image according to Embodiment 3. FIGS. 12A to 12C are explanatory diagrams for describing correction of the exposure image. More specifically, FIG. 12A shows a state before the correction, FIG. 12B shows illuminance correction, and FIG. 12C shows a state after the correction. The light source 21, which is an example of the adjusting unit, can adjust the output of the light source 21 for each projector 20. The controlling unit 110 adjusts an illuminance level difference of the boundary region KR by controlling the light source 21.

As illustrated in FIG. 11, after the start of the manufacture, at a photographing timing of each predetermined time (1 second) (YES in S42), by using the camera 130, the CPU 111 photographs the projection image of the exposure image projected onto the boundary region KR, and captures the photographed image (S43).

In Embodiment 3, the portion located in the boundary region KR of the product projection image extending over the two projection images is detected, and the illuminance correction amount of the two projection images is obtained (S44).

For example, when there is an illuminance difference in the product projection images 30G and 30G' as illustrated in FIG. 12A and the illuminance difference is detected as illustrated in FIG. 12B, the illuminance difference in the product projection images 30G and 30G' are corrected as indicated by the broken line. Thus, as illustrated in FIG. 12C, the illuminances of the product projection images 30G and 30G' sandwiching the boundary are made equivalent.

The CPU 111 extracts the portion located in the boundary region KR of the product projection images 30G and 30G' of the adjacent projection images TG and TG'. Then, an average illuminance of the product projection image 30G is compared with an average illuminance of the product projection image 30G' in this portion, thereby obtaining the illuminance correction amount (S44).

The CPU 111 corrects the exposure image RG of each layer to be used for subsequent manufacture of the product manufactured object 30 so as to change the brightness gradation of the product manufactured object in the original exposure image RG by the illumination correction amount (S45). When the manufacture of the product manufactured object 30 ends (YES in S41), the CPU 111 ends the illuminance correction control of the projection image.

In Embodiment 3, brightness information of the first exposure image or the second exposure image corresponding to the boundary region KR is adjusted. Therefore, it is possible to suppress the streak in the manufacturing direction (i.e., dispersion in manufacturing length in a direction along the boundary) caused by the illuminance level difference in the boundary region.

Incidentally, in the additive manufacturing apparatus 100, it is also possible to adjust the illuminance of the entire projection image TG by changing output of the light source 21. Accordingly, the controlling unit 110 can adjust the illuminance level difference of the boundary region KR by controlling the light source 21. By controlling the light source 21, it is possible to reduce the illuminance level difference in the boundary region KR and suppress the streak in the manufacturing direction (i.e., the dispersion in the manufacturing length in the direction along the boundary) caused by the illuminance level difference.

Embodiment 4

In Embodiment 4, the inclination of the image forming element 27 is adjusted according to the inclination of the transmitting member 12, thereby securing a liquid layer 31 having an appropriate thickness between the transmitting member 12 and the product manufactured object 30.

(Deflection of Projection Surface)

Figure 13A:
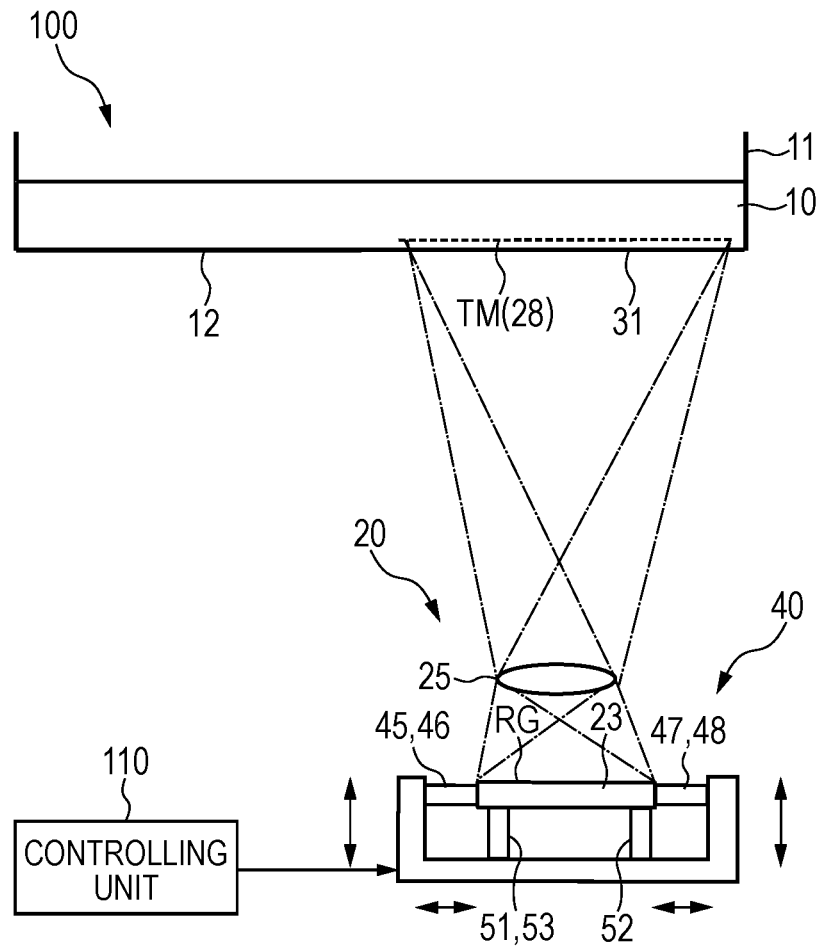
FIG. 13A is an explanatory diagram for describing a deflection of a projection surface. More specifically.
Figure 13B:
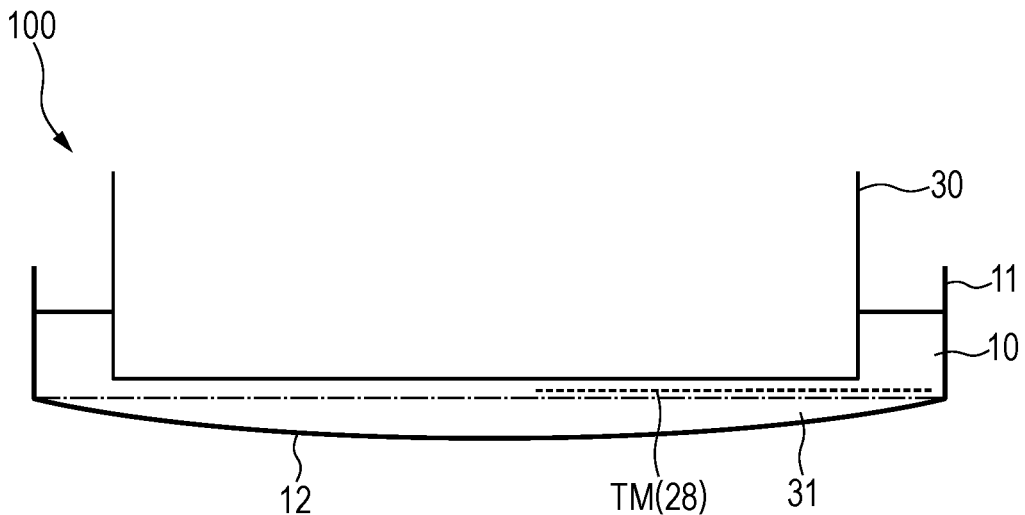
FIG. 13B is an explanatory diagram for describing the deflection of the projection surface. More specifically.
Figure 14:
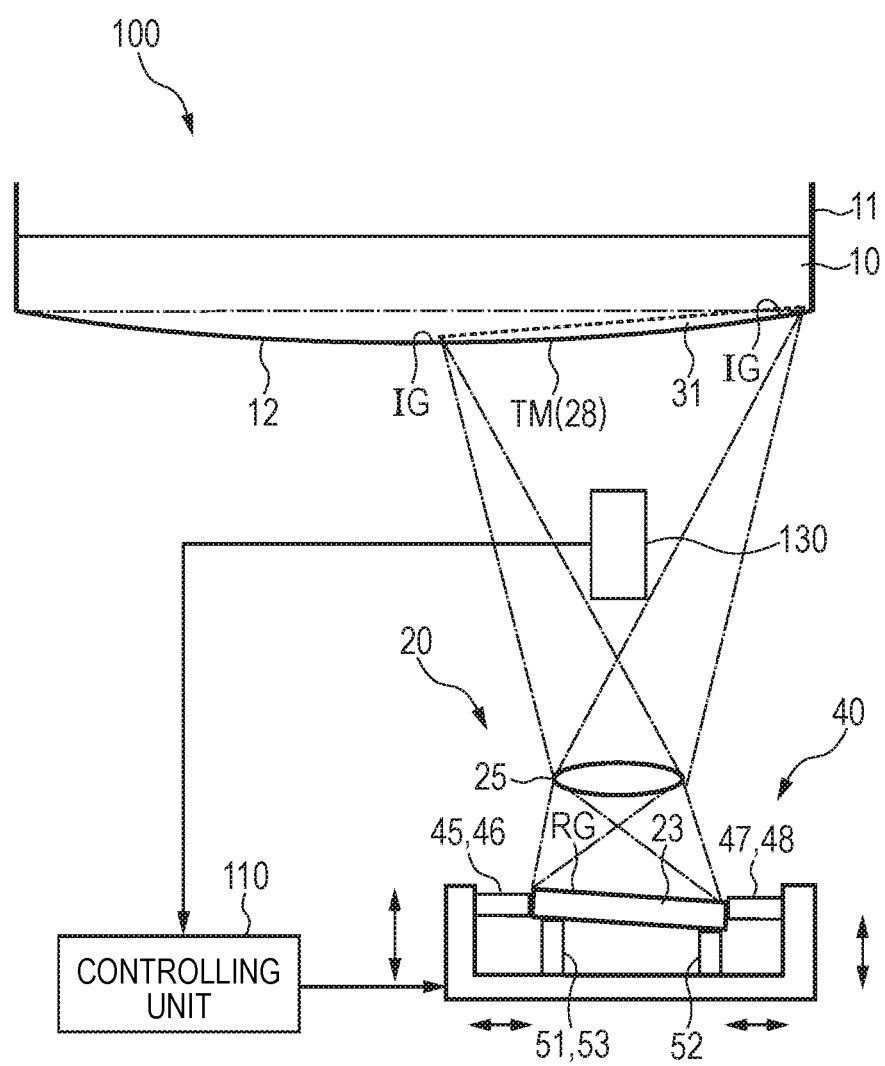
FIG. 14 is an explanatory diagram for describing an inclination adjusting mechanism of the projection surface of the exposure image.

FIGS. 13A and 13B are explanatory diagrams for describing a deflection (or flexure) of the projection surface, and FIG. 14 is an explanatory diagram for describing an inclination adjusting mechanism of the projection surface of the exposure image. More specifically, FIG. 13A shows the projection surface, and FIG. 13B shows the deflection of the transmitting member. As illustrated in FIG. 13A, the transmitting member 12 is disposed on the bottom surface of the vessel 11, and the resin material 10 is stored on the transmitting member 12. As described above, the projection optical system 25 projects the exposure image RG formed on the image forming element 23 onto the projection surface TM formed at the image forming position 28.

As illustrated in FIG. 4A, the image displaying unit 40 holds, by the actuators 51 to 53, the image forming element 23 inside the casing 40f so that the inclination angle thereof can be adjusted within the XZ plane and the YZ plane. Namely, the actuators 51 to 53 can adjust the inclination of the image forming element 23 with respect to the projection optical axis of the exposure image. The actuators 51 to 53 can expand and contract according to the applied DC voltage and rotate the image forming element 23 in the XZ plane. Therefore, the controlling unit 110 can arbitrarily adjust the inclination of the projection surface TM.

In the additive manufacturing apparatus 100, when the transmitting member 12 is made thick, sufficient oxygen cannot be supplied to the interface with the resin material 10, so that the liquid layer 31 cannot be formed. On the other hand, in the additive manufacturing apparatus 100, the large manufacturing area is secured such that the large-sized product manufactured object 30 can be formed. Therefore, as illustrated in FIG. 13B, when the resin material 10 is injected into the vessel 11, the rigidity of the transmitting member 12 becomes insufficient, and the center of the transmitting member 12 is deflected downward by gravity.

As a result, since the liquid layer 31 having the appropriate thickness is not secured between the transmitting member 12 and the product manufactured object 30, accurate manufacture at the image forming position 28 cannot be performed. Besides, since the transmitting member 12 under the projection surface TM is inclined such that the center thereof becomes low and the periphery thereof becomes high, the projection surface TM of the exposure image RG by the projection optical system 25 is greatly away from the transmitting member 12 at the center of the transmitting member 12. In this case, the exposure image is projected, in a state of defocus, on the surface of the transmitting member 12 securing the liquid layer 31 having the appropriate thickness. Thus, the manufacturing resolution of the additive manufacturing apparatus 100 is lowered.

Therefore, the controlling unit 110 obtains the inclination amount of the transmitting member 12 by processing the photographed image of the camera 130. Then, the controlling unit inclines the image forming element 23 in the XZ plane and in the YZ plane by using the actuators 51 to 53, thereby forming the projection surface TM substantially parallel to the transmitting member 12 as illustrated in FIG. 14.

(Angle Correction Control of Projection Surface)

Figure 15:
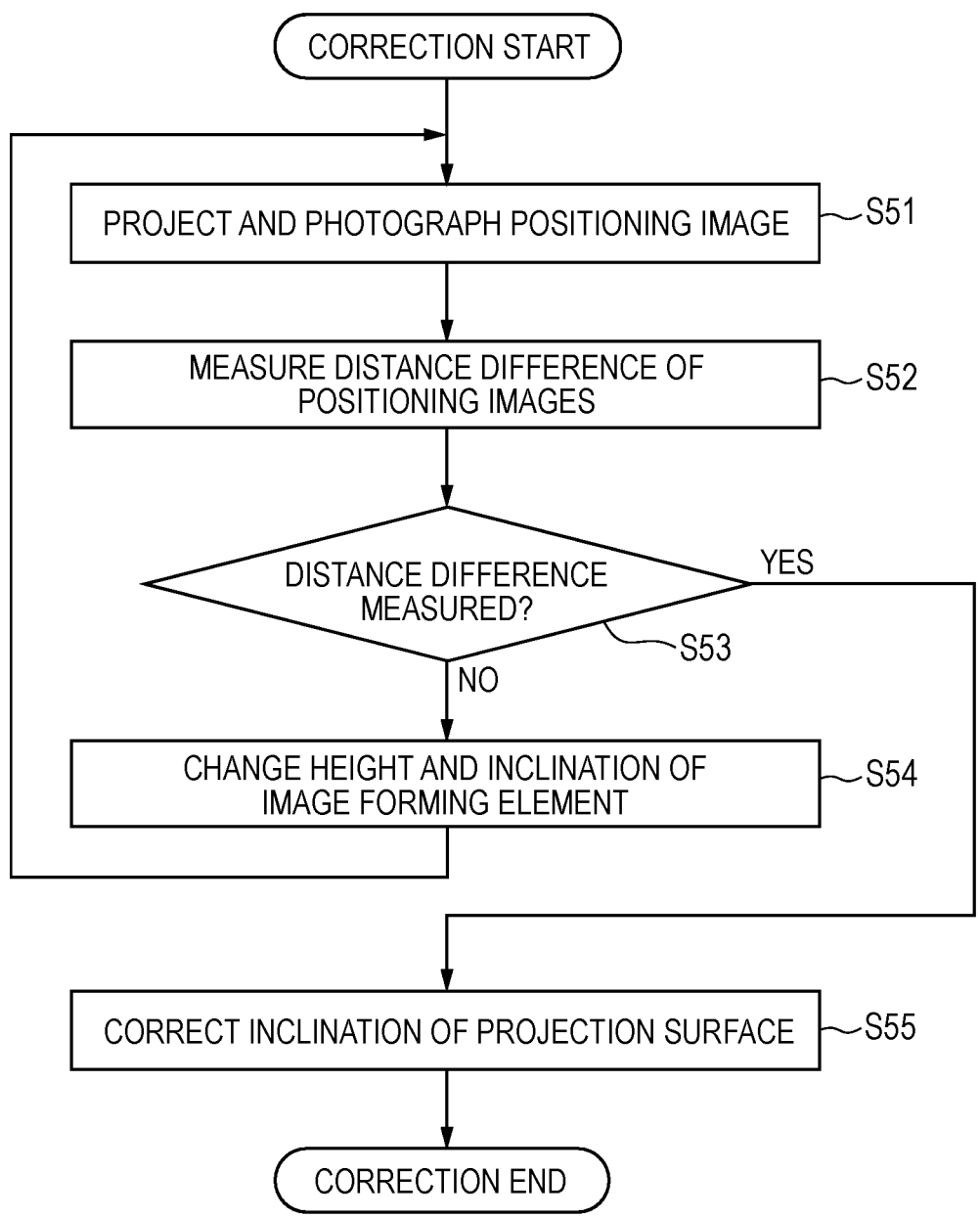
FIG. 15 is a flowchart for describing angle correction control of the projection surface according to Embodiment 4.

FIG. 15 is a flowchart for describing angle correction control of the projection surface according to Embodiment 4. As illustrated in FIGS. 4A to 4C, the actuators 51 to 53, which are the examples of the adjusting unit, can adjust the inclination of the image forming element 23 with respect to the projection optical axis of the exposure image. The controlling unit (110: FIG. 2) adjusts the inclination of the projection surface TM of the projection image TG by controlling the actuators 51 to 53.

As illustrated in FIG. 15, when it is instructed to start the angle correction control, the CPU 111 displays the positioning mark on the image forming element 23, and forms the positioning image IG at the interface between the resin material 10 and the transmitting member 12 as illustrated in FIG. 6. Then, the camera 130 photographs the positioning image IG and captures the photographed image (S51).

The CPU 111 detects a difference in blur amount of the pair of positioning images IG along the boundary between the pair of projection images TG, and attempts to measure a distance difference to the pair of positioning images IG (S52). Then, when the distance difference to the pair of positioning images IG is obtained (YES in S53), the CPU operates the actuators 51 to 53 such that the distances to the pair of positioning images IG coincide with each other, thereby setting the projection surface TM to be inclined substantially parallel to the transmitting member 12 (S55).

That is, when one of the pair of positioning images IG has a small blur amount and it is clearly detected, it is possible measure the distance difference to the pair of positioning images IG by evaluating a blur amount of the other image. The inclination of the interface of the transmitting member 12 can be obtained from the distance difference measured using a so-called autofocus principle.

When the distance difference to the pair of positioning images IG cannot be obtained, the CPU 111 operates the actuators 51 to 53 to incline the image forming element 23 by a predetermined amount in a direction corresponding to the direction in which the transmitting member 12 is deflected (bent) and inclined (S54). Then, until the distance difference to the pair of positioning images IG is obtained (NO in S53), the projection and the photographing of the positioning image IG are repeated (S51, S52).

Incidentally, in Embodiment 4, the inclination amount of the transmitting member 12 or the deflection amount of its center are estimated by evaluating the photographed image of the positioning image IG by using the camera 130. However, it may be possible, by disposing a vertical-direction distance sensor such as an ultrasonic sensor or the like at the center of the transmitting member 12, to measure a descent amount at the center of the transmitting member 12, and estimate the inclination amount of the transmitting member 12 based on the measured descent amount.

Embodiment 5

In the additive manufacturing apparatus 100, if there is a deflection in the transmitting member 12, the deflection itself becomes a cause of a positional shift of the projection image TG, a cause of a magnification difference and a cause of a distortion of an image itself. For this reason, when coping with these causes by correcting the image of the exposure image RG, the correction becomes complicated. Besides, as the size of the vessel 11 increases in order to manufacture the large-sized product manufactured object 30, the deflection of the transmitting member 12 increases. Therefore, in Embodiment 5, a pressure of an oxygen chamber 62 is adjusted according to the inclination of the transmitting member 12, thereby reducing a distortion of the transmitting member 12. Thus, the liquid layer 31 having an appropriate thickness is secured between the transmitting member 12 and the product manufactured object 30.

As illustrated in FIG. 2, in Embodiment 5, the vessel 11 is the resin tank (=monomer-material tank) of the additive manufacturing apparatus 100. The vessel holds the monomer material on the projection surface (=manufacturing surface), and has the transmitting member 12 having ultraviolet light permeability for irradiation of ultraviolet light. As illustrated in FIG. 16B, a space tightly sealed from the outside is provided outside the transmitting member 12 of the vessel 11. A pressurizing unit comprises an adjusting mechanism for introducing gas into the sealed space and adjusting a gas pressure of the sealed space. Then, the controlling unit controls the adjusting mechanism so as to suppress, by controlling an air pressure in the sealed space, deformation (due to gravity) of the transmitting member 12 caused by introducing the resin material 10 into the vessel 11. The controlling unit detects a position of the surface of the transmitting member 12, and controls the air pressure of the sealed space according to a detected value of the position, thereby keeping the position of the surface of the transmitting member 12 within a desired range. The transmitting member 12 is oxygen permeable. The space between the transmitting member 12 and a quartz glass plate 61 is filled with a gas having a pressure higher than atmospheric pressure containing oxygen.

(Oxygen Supplying Chamber)

Figure 16A:
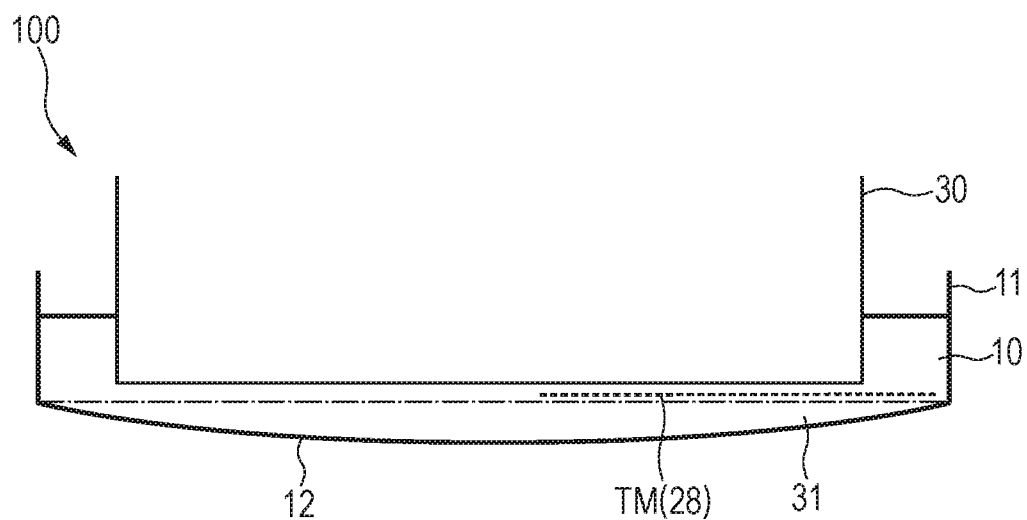
FIG. 16A is an explanatory diagram for describing an oxygen supplying chamber. More specifically.
Figure 16B:
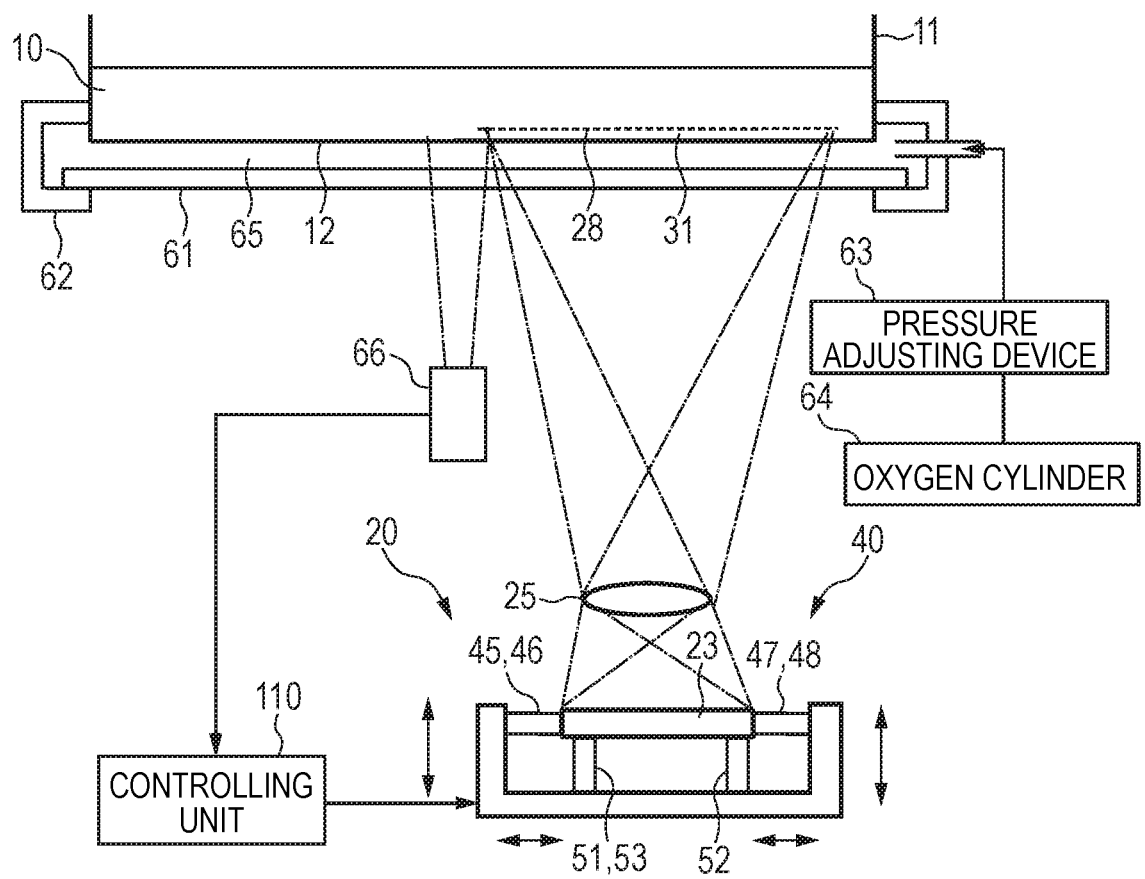
FIG. 16B is an explanatory diagram for describing the oxygen supplying chamber. More specifically.

FIGS. 16A and 16B are explanatory diagrams for describing of an oxygen supplying chamber. More specifically, FIG. 16A is the diagram for describing a deflection state of the transmitting member, and FIG. 16B is the diagram for describing an oxygen supplying system. As illustrated in FIG. 2, the transmitting member 12, which is an example of a first transmitting member, has oxygen permeability, and transmits oxygen to form the oxygen-rich liquid layer 31 at the interface with the resin material 10. The transmitting member 12 holds the resin material 10, and transmits, from below into the resin material 10, the exposure image for solidifying the resin material. The quartz glass plate 61, which is an example of a second transmitting member, forms an oxygen supplying chamber 65 which is an example of the space between the quartz glass plate and the transmitting member 12. The projection optical system 25 transmits the exposure image through the quartz glass plate 61 and the transmitting member 12, thereby projecting transmitted image into the resin material.

As illustrated in FIG. 16A, it is desirable to form that the transmitting member 12 thin in order not to impair the oxygen permeability and the ultraviolet ray permeability. In a case where the transmitting member 12 has a thin thickness not having rigidity as a plate material, when the resin material 10 is stored in the vessel 11, the center of the transmitting member tends to be lowered and the resin material 10 tends to be deformed into an inverted dome shape, due to the weight of the resin material 10. When a large projection area (e.g., 100 mm square or more) is ensured in the transmitting member 12, there is a case where the thickness of the resin material 10 under the manufactured object is different between the center and the periphery of the transmitting member 12 by 100 μm or more. As a result, since the liquid layer 31 having an appropriate thickness is not secured between the transmitting member 12 and the product manufactured object 30, accurate manufacture at the image forming position 28 cannot be performed. Besides, since the transmitting member 12 under the projection surface TM is inclined such that the center thereof is low and the periphery thereof is high, the projection surface TM of the exposure image RG by the projection optical system 25 is greatly away from the transmitting member 12 at the center of the transmitting member 12. In this case, the exposure image is projected, in a state of defocus, on the surface of the transmitting member 12 securing the liquid layer 31 having the appropriate thickness. Thus, the manufacturing resolution of the additive manufacturing apparatus 100 is lowered. Therefore, in Embodiment 5, as illustrated in FIG. 16B, the oxygen chamber 62 is disposed outside the vessel 11 and the quartz glass plate 61 which transmits the ultraviolet light is brought into close contact with the bottom surface of the oxygen chamber 62, thereby forming the airtight oxygen supplying chamber 65. Then, oxygen gas supplied from an oxygen cylinder 64 can be adjusted to an arbitrary pressure by a pressure adjusting device 63 and supplied to the oxygen supplying chamber 65.

Then, the pressure adjusting device 63, which is an example of the pressurizing unit, supplies oxygen to keep the gas pressure of the oxygen supplying chamber 65 higher than the atmospheric pressure. By adjusting the pressure adjusting device 63 and increasing the pressure of the oxygen supplying chamber 65, the weight of the resin material 10 is canceled out and the transmitting member 12 is upwardly pushed back to the horizontal state to keep the pressure. Incidentally, the gas to be supplied to the oxygen supplying chamber 65 may be 100% oxygen, but may be a gas such as nitrogen containing oxygen. Also, the atmosphere may be used as the gas. In order to suppress the deflection of the transmitting member 12, it is necessary to apply a certain pressure. However, in this case, when pure oxygen gas is used, there is a possibility that an oxygen inhibiting effect by the transmitting member 12 becomes too large. In such a case, it is possible to control an oxygen supply amount by decreasing a partial pressure of the oxygen contained in the supplied gas. That is, the pressure adjusting device 63 can adjust the pressure of the supplied gas and the oxygen partial pressure.

The controlling unit 110 obtains the pressure and the oxygen partial pressure of the oxygen supplying chamber 65 capable of correcting the deflection of the transmitting member 12, by using the pressure of the gas to be supplied, the oxygen partial pressure, and the oxygen permeability of the transmitting member 12 as three parameters. Then, the controlling unit 110 controls the pressure adjusting device 63 such that the obtained pressure and the obtained oxygen partial pressure are output, thereby achieving both the oxygen inhibiting effect and the deflection correcting effect of the transmitting member 12.

A distance sensor 66 projects a visible-light index into the resin material 10 and images an index image formed by a difference in refractive index of the interface between the resin material 10 and the transmitting member 12. Then, by performing so-called autofocus control for adjusting the focal length of the lens such that the index image is formed on the imaging element of the distance sensor 66, the distance to the index image is measured. The controlling unit 110 operates the pressure adjusting device 63 such that the distance to the index image output by the distance sensor 66 is made coincident with a reference value in which the transmitting member 12 does not have distortion. The controlling unit 110 automatically controls the pressure of the oxygen supplying chamber 65 so as to cancel out the distortion of the transmitting member 12.

Embodiment 6

As illustrated in FIG. 8A, when the center-to-center distance between the two adjacent projection regions increases, the gap is formed in the product projection image 30G, so that the resin material located in the gap is not solidified. Therefore, in Embodiment 6, the exposure image of the product manufactured object is subjected to an image process, so that the gap is difficult to be formed in the product projection image 30G even when the center-to-center distance between the two adjacent projection regions increases. Namely, when dividing the exposure image for each projector 20, an image range and an illuminance gradation of the portion of the boundary region KR extending over the adjacent projection images TG in the manufacture image of the product manufactured object 30 are adjusted.

In the image process according to Embodiment 6, even when there is a positional shift of the image pattern on the boundary between the adjacent projection images TG, the exposure image itself is deformed or adjusted such that an influence on manufacture quality of the product manufactured object 30 is reduced. That is, an overlap region is provided such that the same image data if displayed on both the exposure images adjacent to the boundary region. Then, a duty ratio of each pixel in the overlap region is set such that an illuminance difference between the overlap region and an image adjacent to the overlap region becomes a desired value or less.

(Image Process)

Figure 17A:
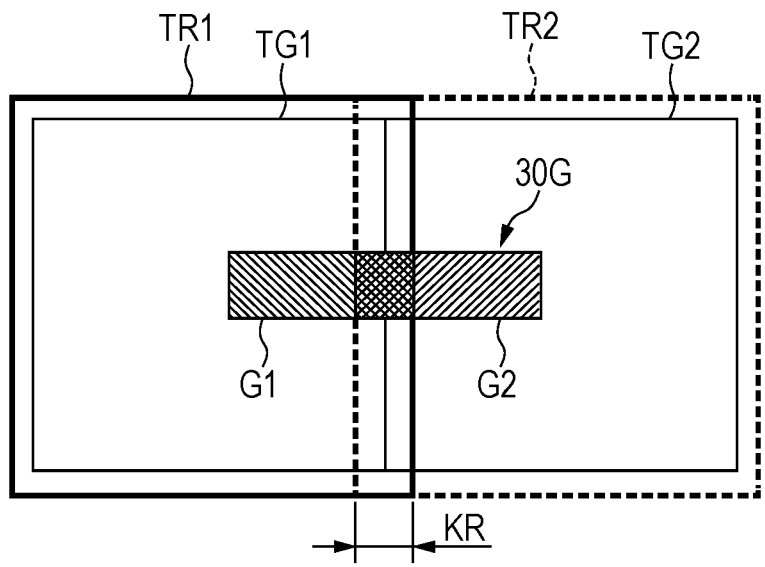
FIG. 17A is an explanatory diagram for describing an image process of the exposure image of a product manufactured object. More specifically.
Figure 17B:
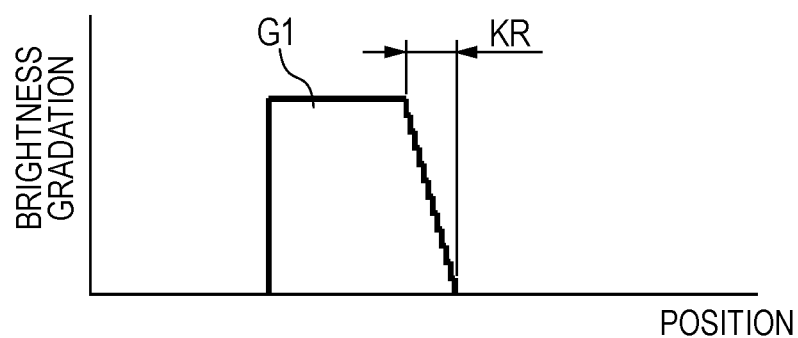
FIG. 17B is an explanatory diagram for describing the image process of the exposure image of the product manufactured object. More specifically.
Figure 17C:
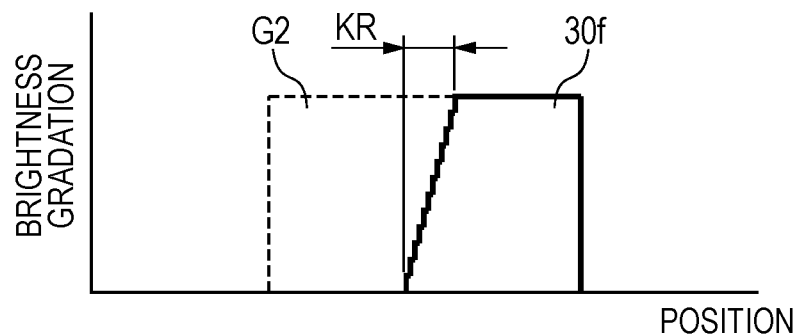
FIG. 17C is an explanatory diagram for describing the image process of the exposure image of the product manufactured object. More specifically.

FIGS. 17A to 17C are explanatory diagrams for describing the image process of the exposure image of the product manufactured object. More specifically, FIG. 17A shows the exposure image of the product manufactured object, FIG. 17B shows the exposure image of one projection region, and FIG. 17C shows the exposure image of the other projection region. In Embodiment 6, an illuminance of a first exposure image (G1) or a second exposure image (G2) corresponding to the boundary region KR is adjusted.

As illustrated in FIG. 17A, the product projection image 30G extends over two projection regions TR1 and TR2.

As illustrated in FIG. 8A, in Embodiment 1, since the product projection image 30G is formed within the range of the projection image TG, the gap of the projection image TG is the gap of the product projection image 30G as it is. On the other hand, in Embodiment 6, as illustrated in FIG. 17B, an illuminance gradation that the projection image G1 protrudes into a projection image TG2 and falls stepwise is given. Besides, as illustrated in FIG. 17C, an illuminance gradation that the projection image G2 protrudes into a projection image TG1 and falls stepwise is given.

Thus, the product projection image 30G located in the boundary region KR is exposed to both the projection image TG1 and the projection image TG2. Thus, even if the center-to-center distance between the adjacent projection regions TR1 and TR2 increases and the gap is formed in the adjacent projection images TG1 and TG2, no gap is generated in the boundary region KR of the product projection image 30G.

As illustrated in FIG. 2, the CPU 111 sets the exposure image of each layer of the product manufactured object 30 and creates the exposure image divided for each projector 20. At this time, the CPU 111 extracts the manufacturing region of the product manufactured object 30 extending over the adjacent exposure images and sets the manufacturing region protruding into the adjacent exposure image. Then, the CPU sets the illuminance of the exposure image of the boundary region such that the illuminance is gradually reduced in the range where the adjacent projection regions TR overlap each other.

Embodiment 7

When the individual exposure image RG obtained by dividing the entire exposure image with the plurality of projectors 20 is projected, the positional shift of the image pattern may be detected at the boundary between the adjacent projection images TG. At this time, as described above, the positional shift of the image pattern may be caused by the magnification difference of the exposure image or the distortion of the projection image. For this reason, when the correction amount of the image data of the exposure image RG in the additive manufacturing apparatus 100 is large, it is desirable to perform calibration of the projection optical system 25. In Embodiment 7, the calibration of the additive manufacturing apparatus 100 will be described.

(Planar Position Adjusting Mechanism)

Figure 18:
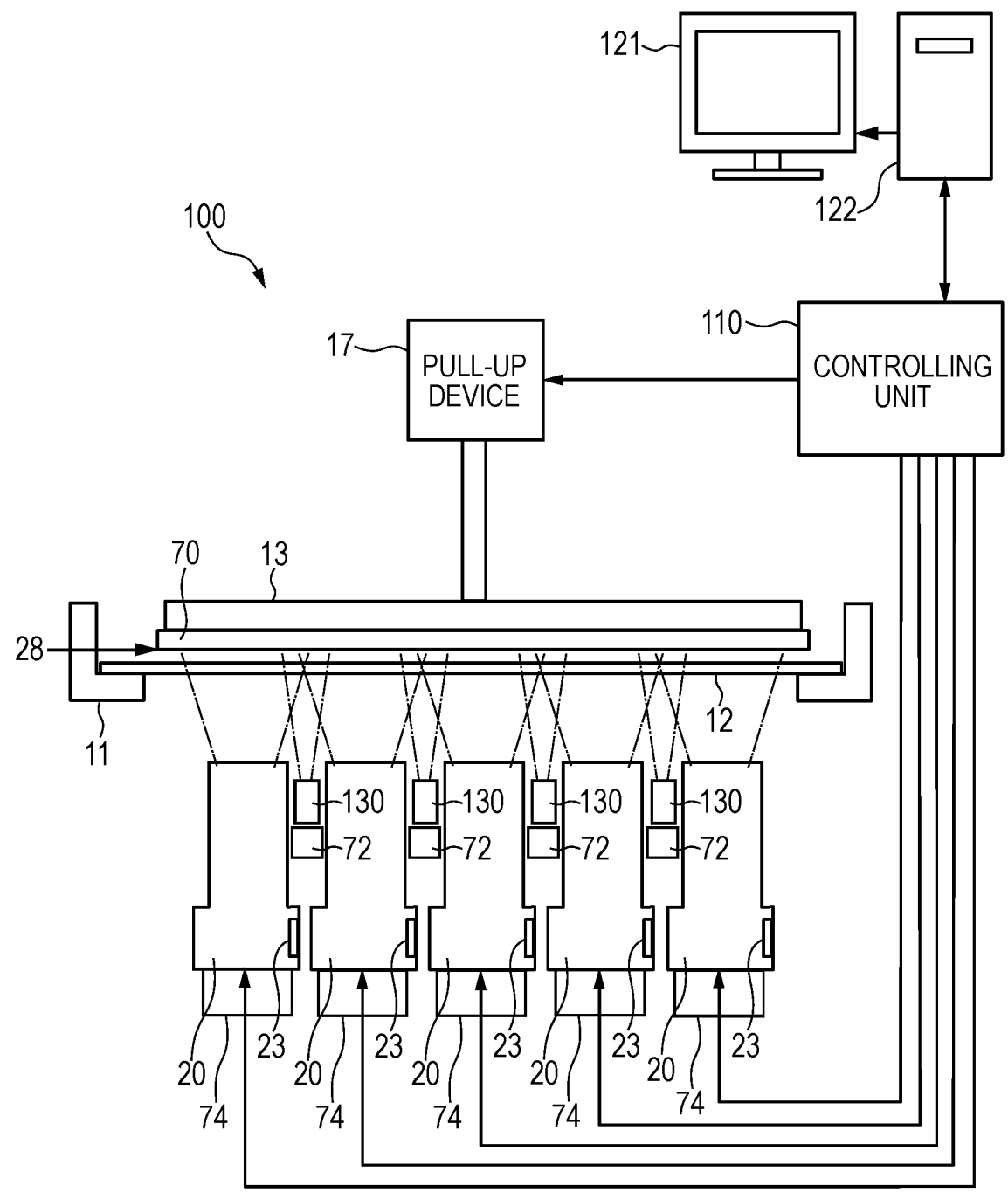
FIG. 18 is an explanatory diagram for describing calibration.

FIG. 18 is an explanatory diagram for describing the calibration. As illustrated in FIG. 18, the camera 130 individually comprises an XY stage 72 having a lock mechanism. The controlling unit 110 can control the XY stage 72 to rotate and translate the photographing region of the camera 130 in the XY plane. The projector 20 individually comprises an XY stage 74 having a lock mechanism. The controlling unit 110 can control the XY stage 74 to rotate and translate the photographing region of the projector 20 in the XY plane. In the calibration, the controlling unit 110 operates the XY stages 72 and 74 to adjust the positions of the camera 130 and the projector 20 respectively, and then locks the XY stages 72 and 74. In the calibration, an instruction operation, a calibration result and an image are displayed through the external computer 122. The controlling unit 110 automatically performs the calibration in response to the instruction operation, and transmits the calibration result and the image to the external computer 122.

(Alignment Reference Plate)

Figure 19A:
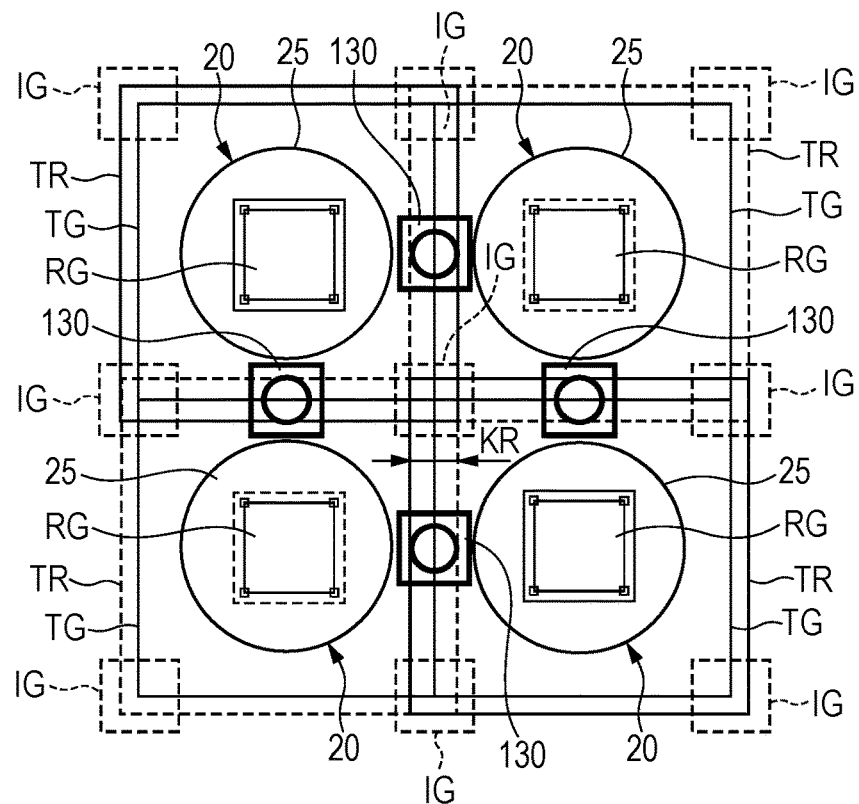
FIG. 19A is an explanatory diagram for describing an alignment reference plate. More specifically.
Figure 19B:
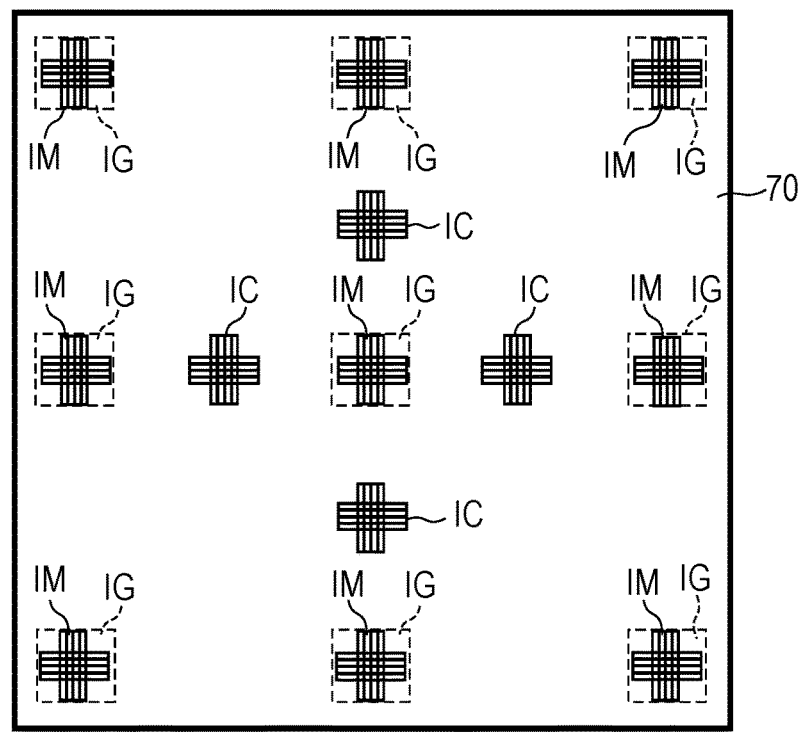
FIG. 19B is an explanatory diagram for describing the alignment reference plate. More specifically.

FIGS. 19A and 19B are explanatory diagrams for describing an alignment reference plate. More specifically, FIG. 19A shows a positioning image, and FIG. 19B shows an alignment plate. FIGS. 19A and 19B schematically show planar arrangements of the four adjacent projectors 20 in FIG. 18. As illustrated in FIG. 18, the calibration is performed by positioning an alignment reference plate 70 at the image forming position 28. By precisely positioning and fixing the alignment reference plate 70 to the pull-up member 13 and actuating the pull-up device 17, the alignment reference plate 70 is positioned at the image forming position 28 of the plurality of projection optical systems 25 with high repeatability. As illustrated in FIG. 19B, the alignment reference plate 70 is a jig to be used at the time of the calibration. On the lower surface of the alignment reference plate 70, four indices IM are arranged for each projector 20, and one index IC is formed for each camera 130.

As illustrated in FIG. 19A, at the position immediately below the index IC facing each camera 130, the controlling unit 110 first adjusts the position of the camera 130 such that the index IC can be photographed at the center of the photographed image. The controlling unit 110 processes the photographed image of the index IC obtained by the camera 130. Then, when there is a positional shift or an inclination between the center position of the photographed image and the index IC, the controlling unit decides that the camera 130 is shifted or inclined, and performs the correction by the XY stage 72.

The controlling unit 110 subsequently operates the projector 20 to project the positioning image IG onto the alignment reference plate 70 by the projection optical system 25 as illustrated in FIG. 19A. The positioning image IG is an aligning pattern which is projected on the projection surface TM where the manufacturing surface is formed. The controlling unit 110 operates the camera 130 to photograph an overlap between the positioning image IG and the index IM of the alignment reference plate 70. The controlling unit 110 reads position information of the positioning image IG included in the photographed and captured data of the camera 130 and position information of the index IM of the alignment reference plate 70, and calculates a necessary adjustment amount of the projector 20.

The controlling unit 110 processes the photographed image, and obtains a positional shift amount between the positioning image IG and the index IM and an inclination amount. Then, the controlling unit operates the XY stage 74 to adjust the positional shift amount and the inclination amount, and adjusts an enlargement magnification of the projector 20. The controlling unit 110 adjusts the position and the enlargement magnification of the projection optical system 25, such that the four positioning images IG for each projection optical system 25 are positioned on the corresponding four indices IM of the alignment reference plate 70 and the positioning images IG of the adjacent projectors 20 overlap each other.

Incidentally, from the viewpoints of workability and mechanical adjustment accuracy, it is preferable to perform the calibration in a state that the resin material 10 is removed from the vessel 11 as illustrated in FIG. 18. However, since the photographed image of the camera 130 is not actually information reflecting a refractive index of the resin material 10, it is necessary to perform final confirmation in a state that the resin material 10 is introduced into the vessel 11. Alternatively, the calibration may be carried out by introducing an inexpensive liquid having the same refractive index as that of the resin material 10 and having no light manufacturability.

Embodiment 8

In Embodiment 5, as illustrated in FIGS. 16A and 16B, the oxygen supplying chamber 65 is provided on the lower surface of the transmitting member 12, the gas pressure in the oxygen supplying chamber 65 is increased by the pressure adjusting device 63, and thus the deflection of the transmitting member 12 is canceled out. On the other hand, in Embodiment 8, as illustrated in FIG. 20, a liquid tank 201 is provided on the lower surface of the transmitting member 12, and an oxygen-soluble liquid 202 is filled in the liquid tank 201 to apply buoyancy, thereby canceling the deflection of the member 12.

(Liquid Tank)

Figure 20:
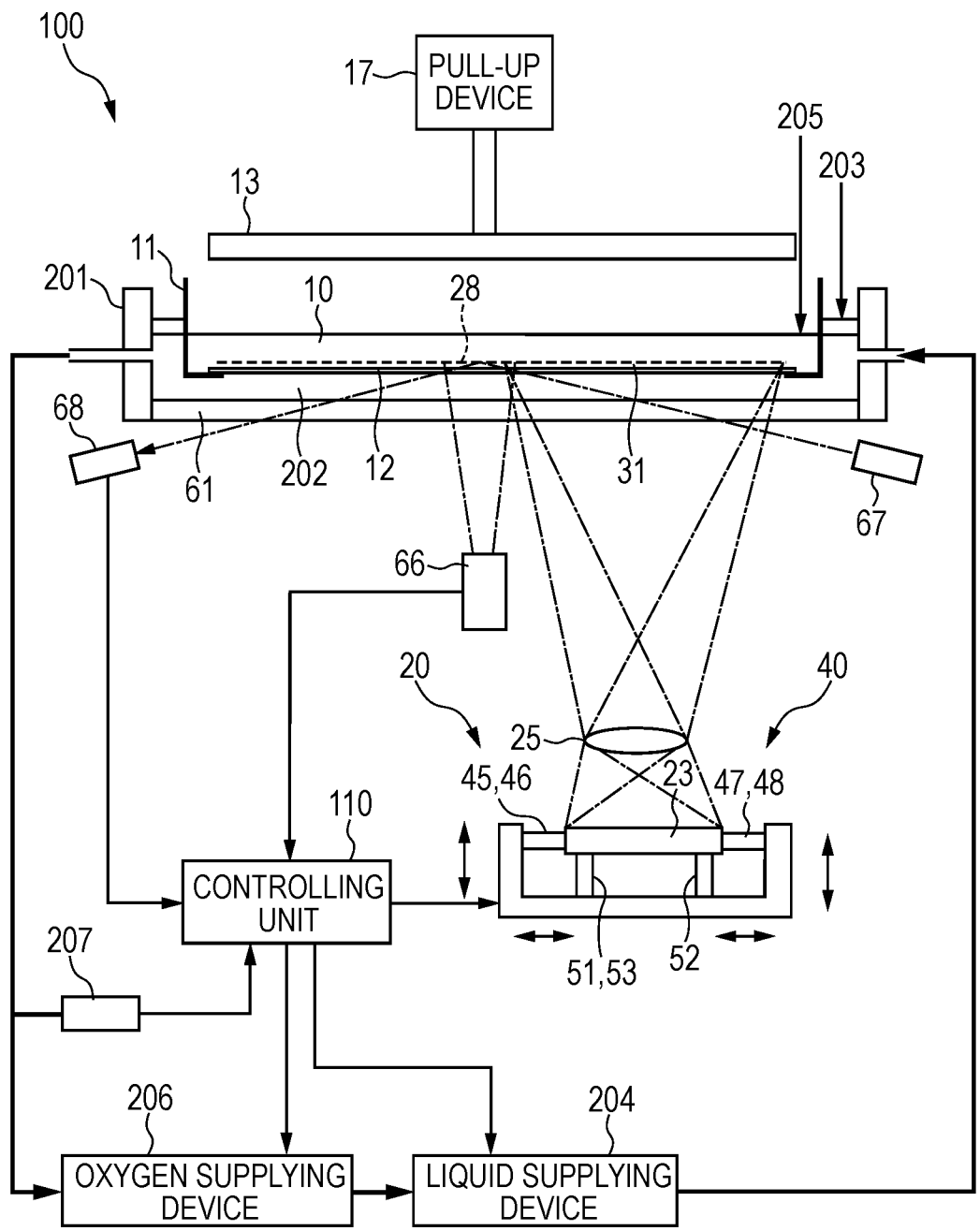
FIG. 20 is an explanatory diagram for describing a liquid tank in Embodiment 8.

FIG. 20 is the explanatory diagram for describing the liquid tank according to Embodiment 8. As illustrated in FIG. 20, the transmitting member 12, which is the example of the first transmitting member, holds the photosetting liquid resin material and transmits the exposure image which solidifies the resin material. A quartz glass plate 61, which is an example of the second transmitting member, forms a space between the quartz glass plate and the transmitting member 12. The projector 20, which is the example of the image projecting unit, projects the exposure image into the resin material through the quartz glass plate 61 and the transmitting member 12. The pull-up device 17, which is the example of the moving unit, moves a not-illustrated manufacturing layer manufactured by solidifying the resin material by the exposure image away from the transmitting member 12. The transmitting member 12 is a membrane material of a fluororesin having oxygen permeability. The transmitting member 12 allows oxygen dissolved in the oxygen-soluble liquid 202 to be transmitted toward the resin material 10, thereby forming the oxygen-rich liquid layer 31 at the interface between the transmitting member 12 and the resin material 10.

As described above, in the additive manufacturing apparatus 100, if there is the deflection in the transmitting member 12, the deflection itself becomes the cause of the positional shift of the projection image (TG: FIG. 5), the cause of the magnification difference and the cause of the distortion of the image itself. For this reason, when coping with these causes by correcting the image of the exposure image RG, the correction becomes complicated. Therefore, in Embodiment 8, the liquid tank 201 is provided outside the vessel 11, and the space between the transmitting member 12 and the liquid tank 201 is filled with the oxygen-soluble liquid 202, thereby reducing the deflection of the transmitting member 12. The space between the transmitting member 12 and the quartz glass plate 61 is filled with the oxygen-soluble liquid in which oxygen having a mole fraction of 0.001 or more is dissolved so as not to impede oxygen supply to the transmitting member 12.

The vessel 11 is the resin tank (monomer-material tank) of the additive manufacturing apparatus 100, and the vessel holds the monomer material on the projection surface (manufacturing surface). The transmitting member 12 having ultraviolet light permeability for irradiating ultraviolet light is provided on the lower surface of the vessel 11. Then, a liquid supplying device 204 introduces the oxygen-soluble liquid 202 between the transmitting member 12 and the liquid tank 201 to apply pressure from the lower side to the transmitting member 12, thereby preventing the deflection of the transmitting member 12. Then, the liquid layer 31 having an appropriate thickness is secured between the transmitting member 12 and the product manufactured object 30. Further, during the manufacture of the product manufactured object 30, when the product manufactured object 30 is moved in the direction away from the transmitting member 12, the oxygen-soluble liquid 202 being in contact with the transmitting member 12 acts as a damper to resist the deflection of the transmitting member 12 in an upward direction.

The liquid supplying device 204 adjusts a liquid introduction amount so as to suppress a deformation of the transmitting member 12 (caused by gravity) due to the introduction of the resin material 10 into the vessel 11, by introducing the oxygen-soluble liquid 202 into the liquid tank 201. The liquid supplying device 204, which is an example of a liquid amount controlling unit, controls the liquid amount of the oxygen-soluble liquid 202, i.e., a height of a liquid surface 203 such that the projection surface of the transmitting member 12 is kept flat.

Here, in a case where specific gravity of the resin material 10 is the same as that of the oxygen-soluble liquid 202, mere adjustment of a liquid surface 205 of the resin material 10 and the liquid surface 203 of the oxygen-soluble liquid 202 to the same height makes the pressure applied to the transmitting member 12 by the resin material 10 and the pressure applied to the transmitting member 12 by the oxygen-soluble liquid 202 equal to each other. Thus, the transmitting member 12 is not deflected. However, in fact, the specific gravity of the resin material 10 and the transmitting member 12 is different from that of the oxygen-soluble liquid 202. Therefore, the controlling unit 110 detects the position of the surface of the transmitting member 12 by using a distance sensor 66, adjusts the supply amount of the oxygen-soluble liquid 202 according to a detected value of the position, thereby keeping the position of the surface of the transmitting member 12 within a desired range.

The distance sensor 66 projects a visible-light index into the resin material 10, and images an index image formed by a refractive index difference in the interface between the resin material 10 and the transmitting member 12. Then, by performing so-called autofocus control for adjusting a focal length of the lens such that the index image is imaged on an imaging element of the distance sensor 66, a distance to the index image is measured. The controlling unit 110 operates the liquid supplying device 204 such that the distance to the index image output by the distance sensor 66 is coincided with a reference value given in a state that the transmitting member 12 is not deflected. The controlling unit 110 automatically controls the supply amount of the oxygen-soluble liquid 202 with respect to the liquid tank 201 so as to cancel out the deflection of the transmitting member 12.

Instead of the distance sensor 66, it is also possible to use, for example, a distance sensor of a type having a light source unit 67 and a detecting unit 68. In this type, position information on the surface of the transmitting member 12 is obtained by detecting the position where a light beam emitted from the light source unit 67 is reflected on the surface of the transmitting member 12 and is incident on the detecting unit 68.

Besides, it is also possible, by providing an oxygen supplying device 206 in a path for circulating the oxygen-soluble liquid 202 to the liquid supplying device 204, to keep a concentration of the dissolved oxygen of the oxygen-soluble liquid 202 in the liquid tank 201 at a predetermined concentration. The oxygen supplying device 206, which is an example of an oxygen supplying unit, supplies oxygen into the oxygen-soluble liquid 202. An oxygen concentration sensor 207 and the controlling unit 110, which are an example of a measuring unit, measure the oxygen concentration in the oxygen-soluble liquid 202. The controlling unit 110 and the oxygen supplying device 206, which are an example of the adjusting unit, operate the oxygen supplying device 206 such that the oxygen-soluble liquid 202 keeps the predetermined oxygen concentration based on a detection output of the oxygen concentration sensor 207. The oxygen supplying device 206 may be constituted such that a window material such as an oxygen-permeable fluororesin is provided in a part or the whole of the liquid supplying device 204 so as to supply oxygen to the oxygen-soluble liquid 202 from a gas atmosphere containing oxygen such as the atmosphere or the like. The controlling unit 110 adjusts an oxygen supply amount by the oxygen supplying device 206 such that the oxygen concentration of the oxygen-soluble liquid 202 measured by the oxygen concentration sensor 207 becomes the predetermined oxygen concentration.

For the oxygen-soluble liquid 202, a liquid capable of dissolving oxygen having a mole fraction of 0.001 or more, such as perfluorocarbons, can be used. When the oxygen concentration is less than the mole fraction of 0.001, an effective liquid layer 31 cannot be ensured, and there is a possibility that the resin material 10 is solidified on the surface of the transmitting member 12. Preferable specific examples of the oxygen-soluble liquid 202 include perfluorooctane, perfluorobutyl perfluorotetrahydrofuran, perfluoro-1-isopropoxyhexane, perfluoro-1,4-diisopropoxybutane, and the like. Among them, perfluorobutyl perfluorotetrahydrofuran is particularly preferable from the viewpoint of the dissolved oxygen concentration.

Besides, in order to prevent attenuation of the light amount to be used for the exposure, it is necessary to use, as the oxygen-soluble liquid 202, a substance having a high transmissivity of a light beam of wavelength used for the exposure. In the example illustrated in FIG. 20, a UV-LED (ultraviolet light-emitting diode) having the wavelength of 350 nm to 400 nm is used as the light source for the exposure. For this reason, as the oxygen-soluble liquid 202, it is desirable to use a liquid material of which the light transmissivity with respect to the wavelength of 350 nm to 400 nm is 90% or more per 1 cm. Besides, it is desirable that the oxygen-soluble liquid 202 is a substance of which the light transmissivity with respect to the wavelength of 350 nm to 400 nm is 95% or more per 1 cm. Besides, it is more desirable that the light transmissivity of the substance is 99% or more per 1 cm.

In order to precisely control the deflection of the transmitting member 12, it is preferable that the specific gravity of the oxygen-soluble liquid 202 is equal to the specific gravity of the resin material 10. The specific gravity of the oxygen-soluble liquid 202 is preferably within ±80% of the specific gravity of the resin material 10. The specific gravity of the oxygen-soluble liquid 202 is more preferably within ±20% of the specific gravity of the resin material 10, and particularly preferably within ±10%.

The controlling unit 110 controls the supply amount of the oxygen-soluble liquid 202 to the liquid tank 201 by the liquid supplying device 204 and/or the height of the liquid surface 203, in accordance with the detection value of the surface position of the transmitting member 12. Thus, the state that the weight of the resin material 10 is canceled out and the transmitting member 12 is upwardly pushed back until it is horizontal is maintained. The liquid supplying device 204 can also reduce the upward deflection of the transmitting member 12 during the manufacture of the product manufactured object (30: FIG. 2), and hold the transmitting member 12 in a substantially horizontal state. The controlling unit 110 controls the amount of oxygen to be dissolved in the oxygen-soluble liquid 202 by the oxygen supplying device 206, such that the oxygen inhibiting effect of the curing of the resin material 10 by the transmitting member 12 becomes appropriate.

In Embodiment 8, the liquid amount of the oxygen-soluble liquid 202 in the liquid tank 201 is adjusted to reduce the deflection of the transmitting member 12. However, as a modification of Embodiment 8, it may be possible to cause the liquid tank 201 to have a sealed structure and adjust the pressure of the oxygen-soluble liquid 202, thereby reducing the deflection of the transmitting member 12. That is, the liquid supplying device 204, which is an example of a pressure controlling unit, controls the pressure of the oxygen-soluble liquid 202 such that the projection surface of the transmitting member 12 is kept flat.

Embodiment 9

In Embodiment 8, as illustrated in FIG. 20, the constitution that the liquid tank 201 is provided on the lower surface of the horizontal transmitting member 12 and is filled with the oxygen-soluble liquid 202 has been described. In contrast, in Embodiment 9, as illustrated in FIG. 21, a constitution that the liquid tank 201 is provided on the side surface of a vertical transparent member and is filled with the oxygen-soluble liquid 202 will be described.

(Liquid Tank)

Figure 21:
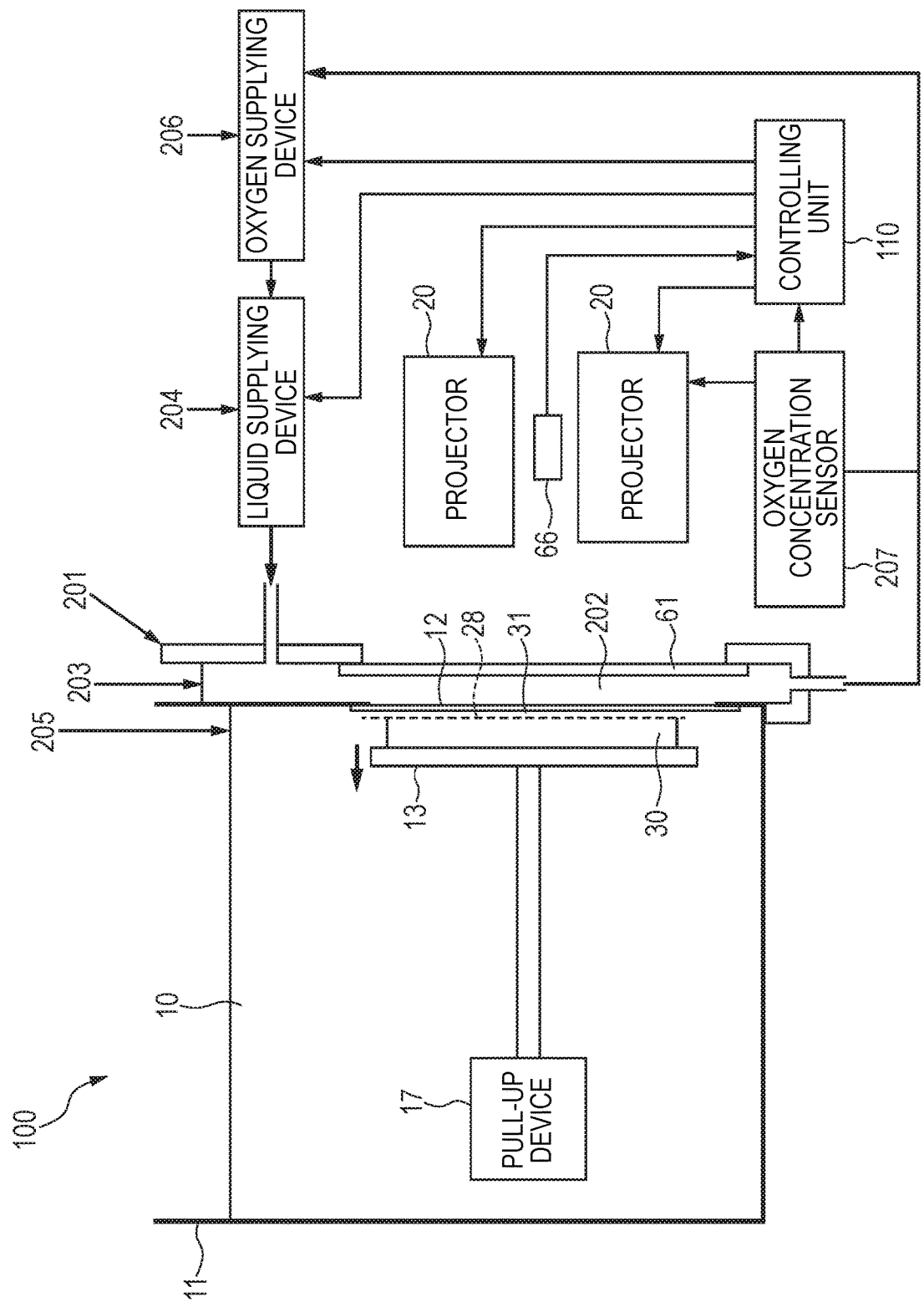
FIG. 21 is an explanatory diagram for describing a liquid tank in Embodiment 9.

FIG. 21 is the explanatory diagram for describing the liquid tank according to Embodiment 9. Incidentally, the constitution of Embodiment 9 is similar to that of Embodiment 8 except for a projection direction of the projection image (TG: FIG. 5) with respect to the resin material 10 and a manufacturing direction of the product manufactured object 30, and is controlled in the same manner as the manner in Embodiment 8. For this reason, in FIG. 21, the same reference numerals as those in FIG. 20 are assigned to the components common to those in Embodiment 8, and redundant explanations will be omitted. Besides, in FIG. 21, the constitution of the projector 20, the aligning mechanism, and the like are omitted.

As illustrated in FIG. 21, in the additive manufacturing apparatus 100 according to Embodiment 3, if there is the deflection in the transmitting member 12, the deflection itself becomes the cause of the positional shift of the projection image (TG: FIG. 5), the cause of the magnification difference and the cause of the distortion of the image itself. Besides, as the size of the vessel 11 increases in order to manufacture the large-sized product manufactured object 30, the deflection of the transmitting member 12 increases. Besides, in Embodiment 9, the transmitting member 12 is disposed on the side surface of the vessel 11, and the exposure image is irradiated in the horizontal direction from the projector 20, thereby manufacturing the product manufactured object 30 in the horizontal direction. When the transmitting member 12 is disposed on the side surface of the vessel 11, the pressure due to gravity applied to the transmitting member 12 when the resin material 10 is introduced into the vessel 11 increases as the position in the transmitting member 12 is lower. Therefore, a higher (heavier) pressure is applied to the lower portion in the transmitting member 12, and the lower portion of the transmitting member 12 bulges outwardly, so that a large deflection occurs. At this time, since the surface shape of the transmitting member 12 is deformed complicatedly, it is difficult to correct the shape of the projection image at the time of the exposure. When coping with such a situation by the correction of the image of the exposure image RG, the correction of the image becomes complicated.

Therefore, in Embodiment 9, the liquid tank 201 is provided outside the transmitting member 12 of the vessel 11, and the oxygen-soluble liquid 202 is filled between the transmitting member 12 and the liquid tank 201. The oxygen-soluble liquid 202 applies a higher (larger) pressure at the lower position of the transmitting member 12, and the resin material 10 applies a higher (larger) pressure at the lower position of the transmitting member 12, so that these higher pressures at the lower position of the transmitting member 12 can be cancelled out by the oxygen-soluble liquid 202. Besides, by adjusting the liquid amount of the oxygen-soluble liquid 202, the deflection of the transmitting member 12 is reduced, and the liquid layer 31 having an appropriate thickness is secured between the transmitting member 12 and the product manufactured object 30.

In Embodiment 9, the transmitting member 12 having the ultraviolet light permeability for performing the irradiation of ultraviolet light is disposed on the side surface of the vessel 11. The projector 20 irradiates the exposure image for solidifying the resin material 10 from the side of the transmitting member 12 into the resin material 10. The pull-up device 17 moves the product manufactured object 30 in the horizontal direction to perform the manufacture.

In Embodiment 9, the liquid tank 201 is provided outside the vessel 11, and the oxygen-soluble liquid 202 is filled between the vessel 11 and the liquid tank 201. As each of the quartz glass plate 61 and the oxygen-soluble liquid 202, a material having a low absorptivity with respect to light having the wavelength used for the exposure is used. The oxygen-soluble liquid 202 is desirably a material which transmits 90% or more of light having a wavelength to be used for the exposure. The oxygen-soluble liquid 202 applies the pressure from the side to the transmitting member 12 to cancel out the horizontal deflection of the transmitting member 12 due to the pressure of the resin material 10. Here, when the specific gravity of the resin material 10, the specific gravity of the transmitting member 12 and the specific gravity of the oxygen-soluble liquid 202 are the same, the pressures applying on both the surfaces of the transmitting member 12 are canceled out by adjusting the liquid surface 205 of the resin material 10 and the liquid surface 203 of the oxygen-soluble liquid 202 to the same height. However, in fact, the specific gravities of the resin material 10, the transmitting member 12 and the oxygen-soluble liquid 202 are different respectively.

Therefore, the controlling unit 110 adjusts a liquid amount to be supplied to the liquid tank 201 by the liquid supplying device 204, such that the deformation of the transmitting member 12 toward the outside occurring due to the weight of the resin material 10 in the vessel 11 is canceled out or suppressed by the pressure of the oxygen-soluble liquid 202. As well, as Embodiment 8, the controlling unit 110 detects the position of the surface of the transmitting member 12 from the outside of the liquid tank 201 by using the distance sensor 66, and adjusts the supply amount of the oxygen-soluble liquid 202 according to the detected value of the position. The controlling unit 110 controls the liquid supplying device 204 according to the surface position of the transmitting member 12 to adjust the supply amount of the oxygen-soluble liquid 202 with respect to the liquid tank 201 and/or the height of the liquid surface 203. Thus, a pressure distribution in a depth direction that the resin material 10 exerts on the transmitting member 12 is canceled out, and the transmitting member 12 is pushed back to the vertical state and held.

The distance sensor 66 projects a visible-light index into the resin material 10 and images an index image formed by a difference in refractive index of the interface between the resin material 10 and the transmitting member 12. Then, by performing so-called autofocus control for adjusting the focal length of the lens such that the index image is formed on the imaging element of the distance sensor 66, the distance to the index image is measured. The controlling unit 110 operates the liquid supplying device 204 such that the detected distance to the index image is made coincident with a predetermined reference value. The controlling unit 110 automatically controls the supply amount of the oxygen-soluble liquid 202 to the liquid tank 201 so as to cancel out a vertical deflection distribution of the transmitting member 12 and hold the transmitting member 12 substantially linearly. The deflection of the transmitting member 12 caused by the movement of the product manufactured object 30 during the manufacture is reduced by controlling the supply amount of the oxygen-soluble liquid 202 to the liquid tank 201 and/or the height of the liquid surface 203.

Incidentally, when the specific gravities of the resin material 10 and the oxygen-soluble liquid 202 facing each other across the transmitting member 12 are different from each other, even how the liquid amounts of both the material and the liquid are adjusted, the pressure distribution in the direction of the transmitting member 12 applied to the transmitting member 12 cannot be made uniform. Therefore, it is desirable that the resin material 10 and the oxygen-soluble liquid 202 have substantially the same specific gravity.

The oxygen supplying device 206 dissolves a predetermined amount of oxygen in the oxygen-soluble liquid 202 which is to be supplied to the liquid tank 201 by the liquid supplying device 204. The controlling unit 110 controls the amount of the oxygen dissolved in the oxygen-soluble liquid 202 by the oxygen supplying device 206 such that the oxygen inhibiting effect by the transmitting member 12 becomes appropriate.

In Embodiment 9, the liquid amount of the oxygen-soluble liquid 202 in the liquid tank 201 is adjusted to reduce the deflection of the transmitting member 12. However, as a modification of Embodiment 9, it may be possible to cause the liquid tank 201 to have a sealed structure and adjust the pressure of the oxygen-soluble liquid 202, thereby reducing the deflection of the transmitting member 12. That is, the liquid supplying device 204, which is the example of the pressure controlling unit, controls the pressure of the oxygen-soluble liquid 202 such that the projection surface of the transmitting member 12 is kept flat.

Other Embodiments

Figure 22A:
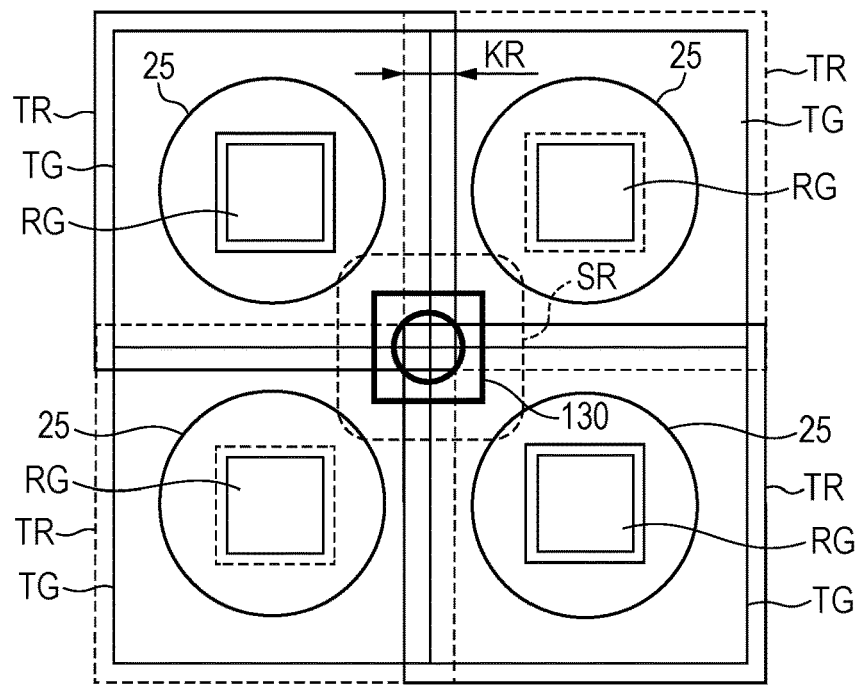
FIG. 22A is an explanatory diagram for describing another example of camera arrangement. More specifically.
Figure 22B:
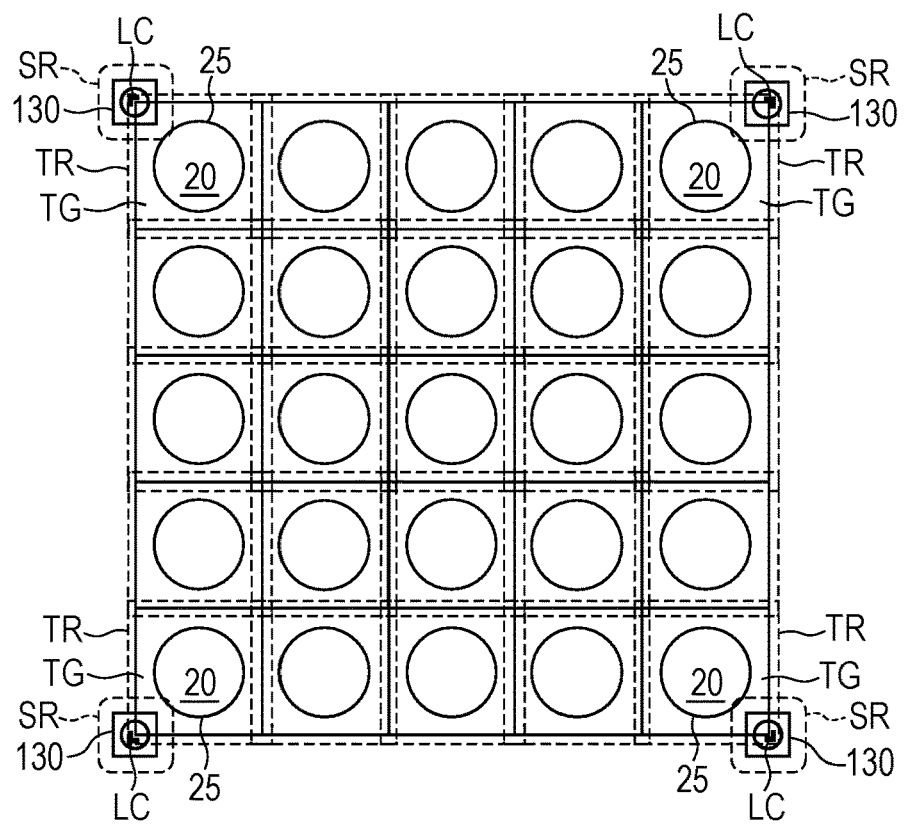
FIG. 22B is an explanatory diagram for describing another example of the camera arrangement. More specifically.
Figure 23:
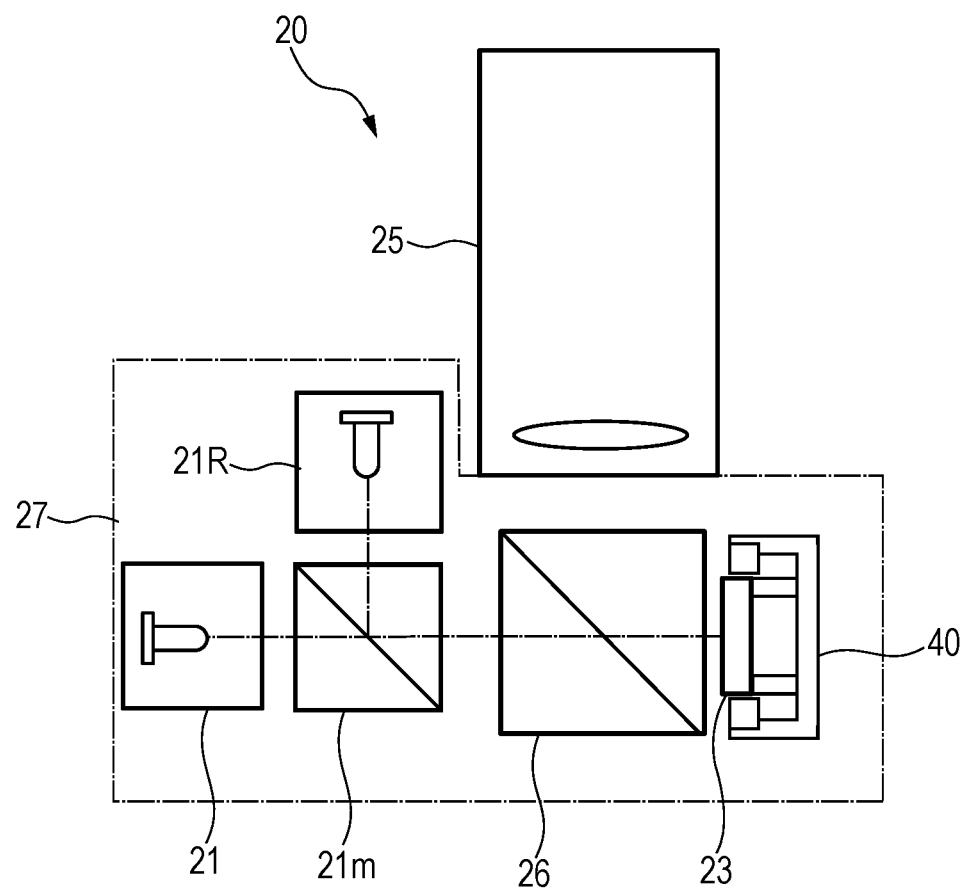
FIG. 23 is an explanatory diagram for describing another example of a light source.
Figure 24A:
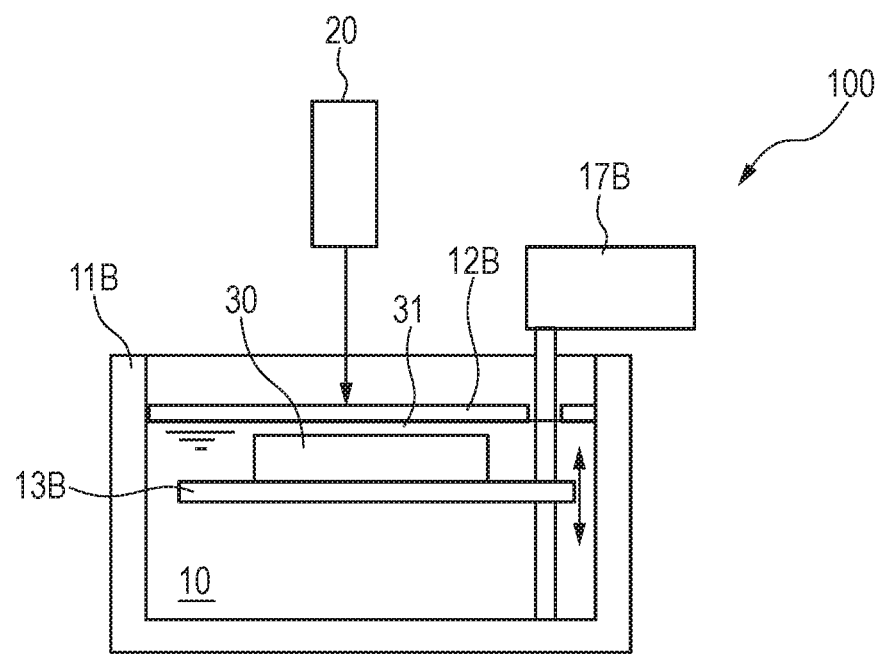
FIG. 24A is an explanatory diagram for describing another example of a manufacturing direction of the product manufactured object. More specifically.
Figure 24B:
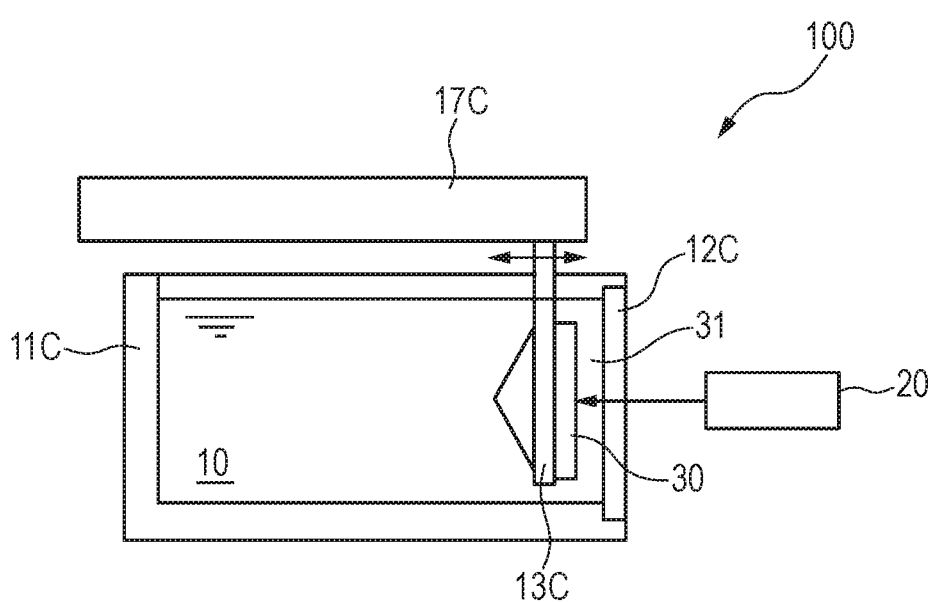
FIG. 24B is an explanatory diagram for describing another example of the manufacturing direction of the product manufactured object. More specifically.

FIGS. 22A and 22B are explanatory diagrams for describing another example of the camera arrangement. FIG. 23 is an explanatory diagram fir describing another example of the light source. FIGS. 24A and 24B are explanatory diagrams for describing other examples of the manufacturing direction of the product manufactured object. More specifically, FIG. 22A shows an intermediate position of the projection optical system, and FIG. 22B shows the outside of the manufacturing region. Besides, FIG. 24A shows an embodiment in which manufacture is performed in the downward direction, and FIG. 24B shows an embodiment in which manufacture is performed in the horizontal direction.

It should be noted that the additive manufacturing apparatus of the present invention is not limited to the specific constitutions, parts form, parts properties, actual dimensions, and the like in Embodiments 1 to 6. Namely, the present invention can also be implemented in another embodiment in which some or all of the constitutions of Embodiments 1 to 6 are replaced with equivalent members.

In Embodiment 1, as illustrated in FIG. 1, the embodiment in which the manufacture of 500 mm×500 mm can be performed using the 5×5 projectors 20 has been described. However, Embodiment 1 can be implemented even in a case where arbitrary number of the projectors 20 such as 2, 3, 4 or the like are used. The projection area of one projector is not limited to 100 mm×100 mm. Namely, it may be possible to use an area of 10 mm×10 mm, 50 mm×50 mm or the like.

In Embodiment 1, the embodiment in which each layer is manufactured by projecting the exposure image into the resin material has been described. However, the invention of adjusting the boundary region of the divided exposure images can also be implemented in an additive manufacturing apparatus which performs exposure by scanning a line image, and an additive manufacturing apparatus which draws an image by scanning a beam spot.

As illustrated in FIG. 22A, the camera 130 may be disposed at an intermediate position in the four projection optical systems 25. Besides, for the camera 130, a photographing region (image extraction region) SR including the corners of the four projection images TG may be set so as to photograph the corners of the four projection images TG at the same time. That is, the disposition of the camera 130 is not limited to the intermediate position between the two projection optical systems 25.

As illustrated in FIG. 22B, the cameras 130 may be arranged to photograph index images LC projected outside the four corners of the 25 projection images TG. The manufacturing region by the 5×5 projectors 20 corresponds to a range which is defined by the outside contour of the 5×5 projection images TG. The index images LC are projected outside the suchlike manufacturing region and within a range where the projectors 20 at the four corners can project the index images.

As illustrated in FIG. 2, the controlling unit 110 causes the four cameras 130 of FIG. 22B to photograph the overlaps between alignment marks provided at the four corners outside the manufacturing region of the transmitting member 12 and the index images LC respectively during the manufacture of the product manufactured object 30. Then, the controlling unit monitors a reference position of the projection image TG in real time. In order to obtain alignment information outside the manufacturing region, the camera 130 is provided at the outer periphery of the manufacturing region.

An alignment mark projecting from the surface or an alignment mark having a light shielding property can be used as long as it is outside the manufacturing region of the transmitting member 12. Besides, as long as it is outside the manufacturing region of the transmitting member 12, even if ultraviolet light is irradiated, curing of the resin which affects the manufacture of the product manufactured object 30 does not occur. Besides, it is possible to perform real-time monitoring of the alignment of the projection image by concurrently using ultraviolet light irradiation control in the image forming element 23, such as irradiation of ultraviolet light only at the detection of the alignment mark, decrease in an irradiation amount, or the like.

As illustrated in FIG. 23, it may be possible to provide a light source 21R which outputs visible light for photography illumination to be used in alignment of the camera (130: FIG. 2). Here, the visible light output by the light source 21R may be overlapped on the ultraviolet light output by the light source 21 with use of a half mirror 21m. Besides, as a light source for alignment, it may be possible to also use as a light source a wavelength range advantageous for the alignment selectively extracted with use of a filter from a broadband light source such as a halogen lamp or the like. Besides, a HeNe laser light source, a blue LED or the like can also be used. However, when illumination light having a wavelength different from that of ultraviolet light is used, it is necessary to change not only focus correction of the camera 130 but also aberration correction of the optical system of the camera 130 according to the wavelength of the illumination light to be used.

As illustrated in FIG. 24A, the product manufactured object 30 may be manufactured so as to grow downward. A vessel 11B is filled with a photosetting liquid resin material 10. A transmitting member 12B having ultraviolet ray permeability and oxygen permeability is disposed in close contact with the resin material 10. The projector 20 projects the exposure image onto a layer of the resin material 10 adjacent to a pull-down member 13B and solidifies it. A pull-down device 17B lowers in a stepwise fashion the pull-down member 13B in synchronism with switching of the exposure image in the projector 20, and manufactures the product manufactured object 30.

As illustrated in FIG. 24B, it may be possible to manufacture the product manufactured object 30 so as to grow in the horizontal direction. A vessel 11C is filled with the photosetting liquid resin material 10. A transmitting member 12C having ultraviolet ray permeability and oxygen permeability is disposed in close contact with the resin material 10. The projector 20 projects the exposure image onto a layer of the resin material 10 adjacent to a moving member 13C and solidifies it. A moving device 17C moves in a stepwise fashion the moving member 13C in synchronism with switching of the exposure image in the projector 20, and manufactures the product manufactured object 30.

In Embodiments 1 to 6, the projector 20 which operates the mirror for each pixel to form the exposure image is adopted. However, it may be possible to constitute the additive manufacturing apparatus by adopting a liquid crystal projector which uses a liquid crystal shutter as the image forming element.

In Embodiments 1 to 6, the image forming element 23 is moved by deforming, in the opposite directions, one (41, 42) and the other (43, 44) of the pair of actuators 41 to 44 arranged across the image forming element 23. However, it may be possible to adopt a constitution in which the other (43, 44) of the actuators 41 to 44 are replaced by spring members and one (41, 42) of the actuators expand and contract against the biasing force of the spring members.

In Embodiment 1, the alignment of the adjacent projection images TG in the boundary region KR is realized by the mechanical movement of the image forming element 23. In Embodiment 2, the alignment of the adjacent projection images TG in the boundary region KR is performed by the data process of the adjacent exposure images. However, it may be also possible to perform the alignment of the adjacent projection images TG in the boundary region KR by properly combining the mechanical movement of the image forming element 23 and the data process of the exposure images.

In Embodiment 2, the image data of the exposure image is processed such that the entire projection image TG is moved within the projection region TR. However, it may be possible to locally deform and correct the image data of the exposure image. Also, it may be possible to adopt an image process which gives the illuminance gradation to the pixel of the exposure image corresponding to the gap detected in the photographed image or gently resolves the level difference detected in the photographed image.

The present invention can be realized also by a process in which a program for realizing one of more functions of the above embodiments is supplied to a system or an apparatus via a network or a storage medium and one or more processors in the system or the apparatus read and execute the supplied program. Besides, the present invention can be realized also by a circuit (e.g., an ASIC) of realizing one or more functions of the above embodiments.

According to the present invention, it is possible to provide the additive manufacturing apparatus in which a streak pattern and/or a slit in a manufacturing direction are/is difficult to be made on the surface of a product manufactured object in the boundary region of a projection region of the exposure image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A manufacturing apparatus comprising:
a first transmitting member configured to hold a photo-setting liquid resin material, wherein an exposure image for solidifying the resin material is transmitted and incident into the resin material through the first transmitting member;
a second transmitting member configured to form a space between the second transmitting member and the first transmitting member;
an image projecting unit configured to transmit the exposure image through the second transmitting member and the first transmitting member and project the transmitted exposure image into the resin material; and
a moving unit configured to move in a stepwise manner a layer to which the resin material has been solidified by the exposure image,
wherein:
the first transmitting member is oxygen permeable; and
the space between the first transmitting member and the second transmitting member is filled with a gas having a pressure higher than an atmospheric pressure containing oxygen or an oxygen-soluble liquid in which oxygen having a mole fraction of 0.001 or more is dissolved.

2. The manufacturing apparatus according to claim 1, further comprising a liquid supplying device configured to introduce a liquid to the space.

3. The manufacturing apparatus according to claim 1, wherein the oxygen-soluble liquid contains at least one selected from perfluorooctane, perfluorobutyl perfluorotetrahydrofuran, perfluoro-1-isopropoxyhexane, and perfluoro-1,4-diisopropoxybutane.

* * * * *